United States Patent
Katsipoulakis et al.

(10) Patent No.: US 12,061,587 B2
(45) Date of Patent: Aug. 13, 2024

(54) QUERY PROCESSING USING HYBRID TABLE SECONDARY INDEXES

(71) Applicant: Snowflake Inc., Bozeman, MT (US)

(72) Inventors: Nikolaos Romanos Katsipoulakis, Redwood City, CA (US); Dimitrios Tsirogiannis, Belmont, CA (US); Zhaohui Zhang, Redwood City, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/171,296

(22) Filed: Feb. 17, 2023

(65) Prior Publication Data

US 2023/0401189 A1 Dec. 14, 2023

Related U.S. Application Data

(60) Provisional application No. 63/366,317, filed on Jun. 13, 2022.

(51) Int. Cl.
*G06F 16/22* (2019.01)
*G06F 16/28* (2019.01)

(52) U.S. Cl.
CPC ...... *G06F 16/2272* (2019.01); *G06F 16/2264* (2019.01); *G06F 16/283* (2019.01); *G06F 16/284* (2019.01)

(58) Field of Classification Search
CPC .......................... G06F 16/2272; G06F 16/283
See application file for complete search history.

(56) References Cited

U.S. PATENT DOCUMENTS

| | | | |
|---|---|---|---|
| 6,484,179 B1 * | 11/2002 | Roccaforte | G06F 16/30 |
| | | | 707/999.102 |
| 7,617,249 B2 | 11/2009 | Thusoo et al. | |
| 9,183,254 B1 | 11/2015 | Cole et al. | |
| 10,318,491 B1 | 6/2019 | Graham et al. | |
| 11,269,824 B1 | 3/2022 | Waas et al. | |
| 11,461,347 B1 | 10/2022 | Das et al. | |
| 11,880,388 B2 | 1/2024 | Katsipoulakis et al. | |

(Continued)

OTHER PUBLICATIONS

"U.S. Appl. No. 18/171,292, Non Final Office Action mailed Jul. 24, 2023", 13 pages.

(Continued)

*Primary Examiner* — Merilyn P Nguyen
(74) *Attorney, Agent, or Firm* — Schwegman Lundberg & Woessner, P.A.

(57) ABSTRACT

The subject technology obtains a read timestamp of a first transaction. The subject technology performs a first read operation on a parent table associated with the first transaction to determine a set of committed versions of the parent table. The subject technology determines whether a key exists in the parent table based on the first transaction. The subject technology, in response to the key existing in the parent table, performs a first write operation on a child table. The subject technology determines whether a duplicate key exists in the child table. The subject technology, in response to determining that there is no duplicate key in the child table, determines whether there is a conflict with the key. The subject technology, in response to determining that there is no conflict with the key, performs a second write operation on a secondary index table of the child table.

27 Claims, 18 Drawing Sheets

(56) References Cited

U.S. PATENT DOCUMENTS

| | | |
|---|---|---|
| 2004/0117600 A1 | 6/2004 | Bodas et al. |
| 2006/0085465 A1 | 4/2006 | Nori et al. |
| 2006/0230016 A1 | 10/2006 | Cunningham et al. |
| 2007/0219999 A1 | 9/2007 | Richey et al. |
| 2010/0287298 A1 | 11/2010 | Leung et al. |
| 2011/0022819 A1 | 1/2011 | Post et al. |
| 2011/0082854 A1 | 4/2011 | Eidson et al. |
| 2011/0320403 A1* | 12/2011 | O'Krafka ............... G06F 16/273 707/E17.007 |
| 2012/0005154 A1* | 1/2012 | George ................. G06F 16/273 707/607 |
| 2012/0110515 A1 | 5/2012 | Abramoff et al. |
| 2013/0246698 A1 | 9/2013 | Estan et al. |
| 2014/0172898 A1* | 6/2014 | Aguilera ................. G06F 16/27 707/759 |
| 2017/0052766 A1 | 2/2017 | Garipov |
| 2017/0316041 A1 | 11/2017 | Delaney et al. |
| 2019/0050437 A1* | 2/2019 | Goyal ................. G06F 16/2272 |
| 2019/0129893 A1* | 5/2019 | Baird, III ............ G06F 16/2474 |
| 2019/0325055 A1* | 10/2019 | Lee ...................... G06F 11/1448 |
| 2020/0364201 A1* | 11/2020 | Cseri ..................... G06F 16/235 |
| 2023/0015344 A1 | 1/2023 | Flanagan et al. |
| 2023/0020330 A1* | 1/2023 | Schwerin .............. G06F 16/256 |
| 2023/0081900 A1* | 3/2023 | Werner .............. G06F 16/2379 707/703 |
| 2023/0401236 A1 | 12/2023 | Katsipoulakis et al. |
| 2024/0104116 A1 | 3/2024 | Katsipoulakis et al. |

OTHER PUBLICATIONS

"U.S. Appl. No. 18/171,292, Notice of Allowance mailed Sep. 20, 2023", 13 pgs.

"U.S. Appl. No. 18/171,292, Response filed Aug. 31, 2023 to Non Final Office Action mailed Jul. 24, 2023", 19 pgs.

\* cited by examiner

T0::TableDPO
- id: 1234
- kvIndexCounter: 2
- mayHaveNestedObjects: True

NestedSliceDPO::NestedObjectDPO
- nestedObjectId: 7865
- nestedObjectDomainId: Domain.TABLE
- id: 1234
- nestedRelationshipTypeId: KV_INDEX_TABLE

NestedSliceDPO::NestedObjectDPO
- nestedObjectId: 3456
- nestedObjectDomainId: Domain.TABLE
- id: 1234
- nestedRelationshipTypeId: KV_INDEX_TABLE

SYS T0 PRIMARY::TableDPO
- id: 7865
- kvIndexCounter: 0
- indexEncodedColumnIds:
- nestingContainerId: 1234
- indexType: PRIMARY

B IDX::TableDPO
- id: 3456
- kvIndexCounter: 1
- indexEncodedColumnIds: "2"
- nestingContainerId: 1234
- indexType: SECONDARY Indexes are table-dependent invisible entities and are connected with the base table using the Nested-Objects Framework.

When a table is dropped, its associated indexes are detached and marked as "deleted". The metadata BG cleaner job is responsible for purging metadata.

QUERY PROCESSING USING HYBRID TABLE SECONDARY INDEXES

CROSS-REFERENCE TO RELATED APPLICATIONS

This application claims priority to U.S. Provisional Patent Application Ser. No. 63/366,317, filed Jun. 13, 2022, entitled "HYBRID TABLE SECONDARY INDEX FOR LOOKUPS, UNIQUE CHECKS, AND REFERENTIAL INTEGRITY CONSTRAINTS," and the contents of which is incorporated herein by reference in its entirety for all purposes.

TECHNICAL FIELD

Embodiments of the disclosure relate generally to a network-based database system or a cloud data platform and, more specifically to performing database processing of analytical and transactional workloads on a hybrid database.

BACKGROUND

Cloud-based data warehouses and other database systems and platforms sometimes provide support for transactional processing that enable such systems to perform operations that are not available through the built-in, system-defined functions.

BRIEF DESCRIPTION OF THE DRAWINGS

The present disclosure will be understood more fully from the detailed description given below and from the accompanying drawings of various embodiments of the disclosure.

FIG. 11 shows an example nested data structure, in accordance with some embodiments of the present disclosure.

DETAILED DESCRIPTION

Figure 1:
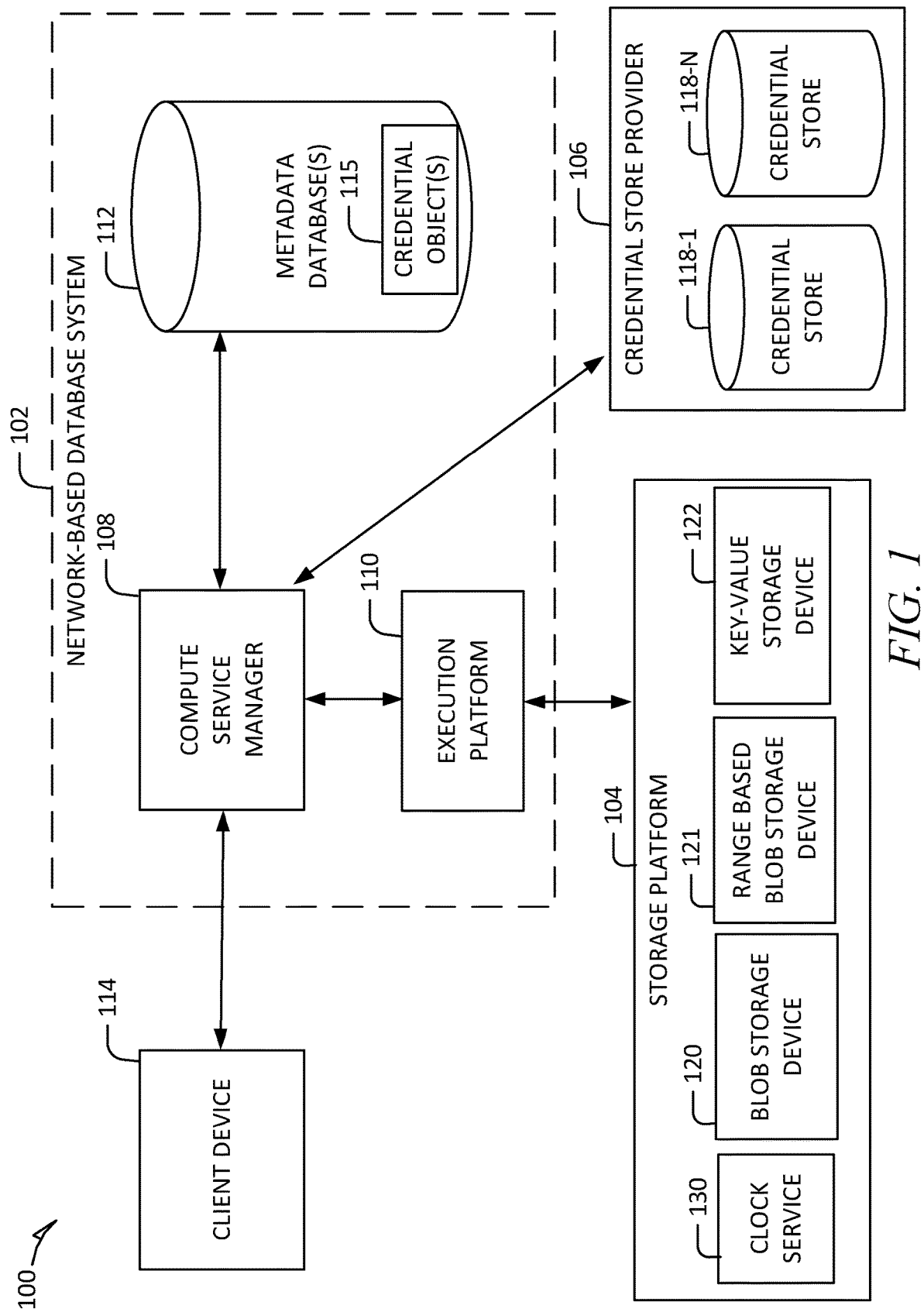
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In database systems, performing transactions on a given database can be supported. To facilitate that a given transaction is committed to a table, existing database systems can employ varying approaches including Online Transactional Processing (OLTP) techniques. As discussed herein, OLTP refers to a category of data processing that involves transaction-oriented tasks. In an example, OLTP involves inserting, updating, and/or deleting varying amounts of data in a given database. OLTP can deal with large numbers of transactions by a large number of users. In some example embodiments, an OLTP database can be implemented as a key-value database in which the data is managed as key-value pairs (e.g., FoundationDB). Increasingly, such transactions are implemented by users that are working in a distributed and networked environment from varying locations and computing environments. Thus, it is also increasingly important to ensure such transactions execute and complete in a concurrent manner that protects the integrity and consistency of the data in such a distributed environment.

As described herein, a database system provides concurrency control and isolation for executing a series of query statements (e.g., Structured Query Language (SQL) statements) within a transaction against a linearizable storage. In particular, the database system herein employs a concurrency control mechanism that is a combination of a multi-version concurrency control for read operations (MVCC) and locking for write operations. Additionally, the database system implements a targeted isolation level (e.g., snapshot isolation), where each statement can execute against a different snapshot of a database, and write locks are held until a transaction commit.

The database system, in an embodiment, implements a two-level transaction hierarchy, where a top-level transaction corresponds to a SQL transaction, and a nested transaction corresponds to a SQL statement within the parent SQL transaction. A given nested transaction can perform read and write operations and can perform a rollback and restart execution zero or more times before succeeding. Upon transaction commit, write operations can become visible, and write locks held by each contained statement can be released.

Further, embodiments of the database system address deadlock detection and resolution for databases. Advantageously, the database system avoids false positives where only transactions involved in a deadlock will be aborted. This is helpful for users to find deadlocks in their application code so that deadlocks can be fixed. In addition, the database system implements embodiments of distributed deadlock detection without a centralized transaction manager. In an example, this is desirable for distributed databases, where each transaction is executed by a separate job, so that the coordination among different jobs/nodes are minimized.

The online analytical processing database (OLAP) is a data structure or data warehouse configured for a relatively small number of complex transactions. OLAP queries are often complex and involve aggregations. For OLAP database systems, the emphasis can be the response time as an effectiveness measure for completing the complex queries. In some example embodiments, OLAP data is stored in object storage (e.g., blob storage). The OLAP database can be configured as a multidimensional database that has one or more hierarchies or formula-based relationships of data within each dimension. Aggregation or consolidation of data in the OLAP database involves computing all of these data relationships for one or more dimensions.

In some example embodiments, a database user can issue a large analytical read request (e.g., an OLAP-style query), against an OLTP database. For example, a user of an OLTP database most often performs point lookups against the OLTP database or other types of singular transactions, however, the user may seek to perform an analytic-style query from time to time. Due to the configuration of OLTP databases, a large read can significantly degrade the performance of the OLTP database and in some cases, a large read can often knock the OLTP database off-line.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS® S3, Microsoft Azure Blob Storage®, or Google Cloud Storage), and a credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses", or "virtual databases" that can provide OLAP or OLTP database processing). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

In an embodiment, a data structure can be utilized for storage of database metadata in the metadata database. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices, including, for example, blob storage device 120 (e.g., storing data in a micro-partition format of an OLAP database), range-based blob storage device 121 (e.g., storing blob of data, each blob corresponding to a range granule), and key-value storage device 122 (e.g., storing key-value pair data of a OLTP database). In some example embodiments, key-value data (e.g., OLTP data) is replicated from the key-value storage device 122 to the blob storage device 120, as discussed in application Ser. No. 17/249,598, titled "Aggregate and Transactional Networked Database Query Processing," filed on Dec. 14, 2020, which is hereby incorporated in its entirety. In some embodiments, the data storage devices of the storage platform 104 are cloud-based storage devices located in one or more geographic locations. For example, the data storage devices may be part of a public cloud infrastructure or a private cloud infrastructure. The data storage devices may be hard disk drives (HDDs), solid state drives (SSDs), storage clusters, Amazon S3™ storage systems, key-value storage devices (e.g., Foundation Database), or any other data storage technology. Additionally, the cloud storage platform 104 may include distributed file systems (such as Hadoop Distributed File Systems (HDFS)), object storage systems, and the like.

As further shown, the storage platform 104 includes clock service 130 which can be contacted to fetch a number that will be greater than any number previously returned, such as one that correlates to the current time. Clock service 130 is discussed further herein below with respect to embodiments of the subject system.

The execution platform 110 comprises a plurality of compute nodes. A set of processes on a compute node executes a query plan compiled by the compute service manager 108. The set of processes can include: a first process to execute the query plan; a second process to monitor and delete cache files (e.g., micro-partitions) using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another.

In alternative embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices in the cloud storage platform 104 (e.g., independently of blob storage device 120). Thus, the computing resources and cache resources are not restricted to specific data storage devices. Instead, all computing resources and all cache resources may retrieve data from, and store data to, any of the data storage resources in the cloud storage platform 104.

Figure 2:
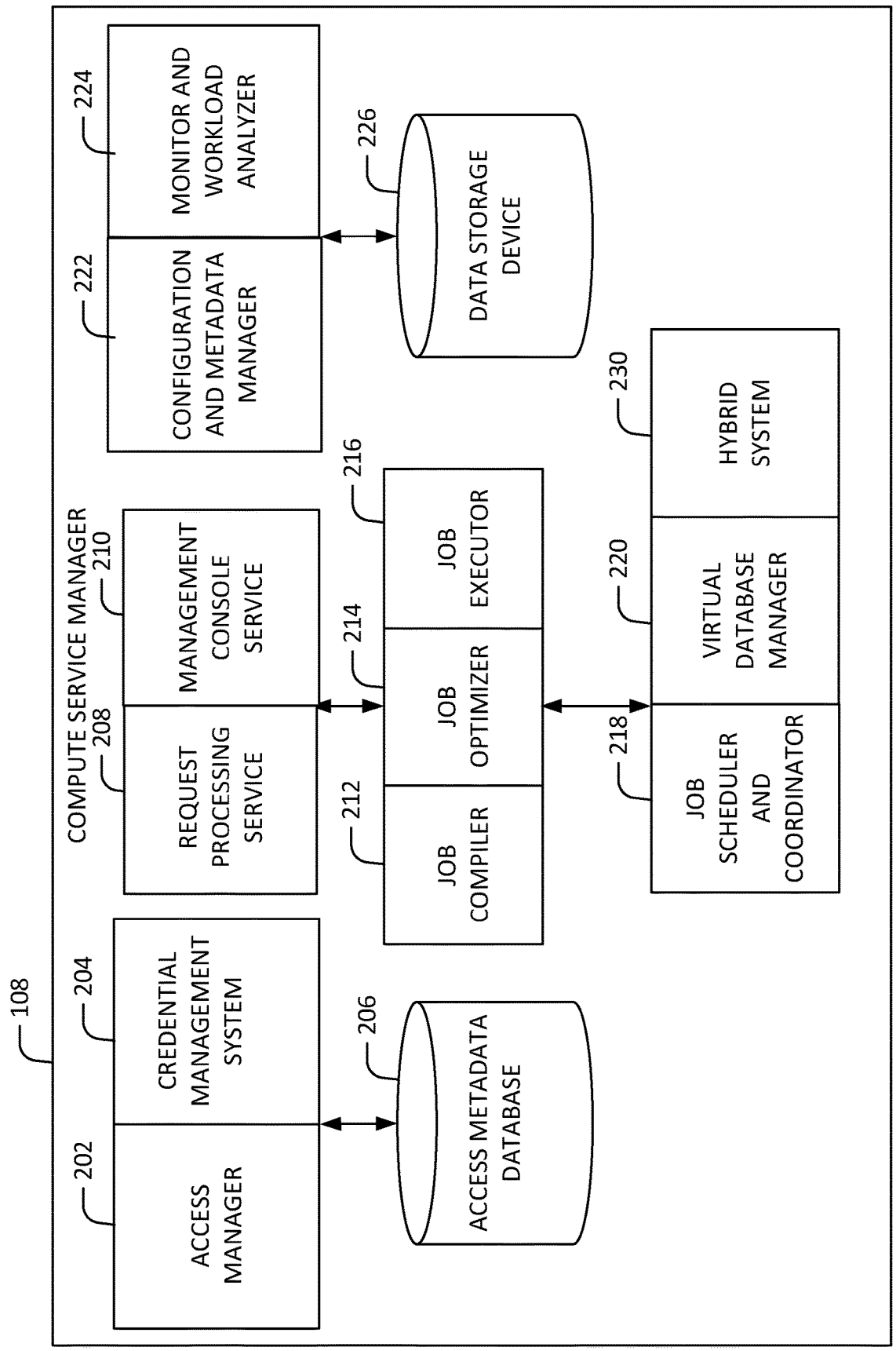
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104) but may utilize the same processing resources in the execution platform 110. In some embodiments, the job scheduler and coordinator 218 identifies or assigns particular nodes in the execution platform 110 to process particular tasks. A virtual database manager 220 manages the operation of multiple virtual databases implemented in the execution platform 110. For example, the virtual database manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files, micro-partition files, need to be accessed to retrieve data for processing a particular task or job. Further details of micro-partitions are discussed in U.S. Pat. No. 10,817,540, which is hereby incorporated in its entirety. A monitor and workload analyzer 224 oversees processes performed by the compute service manager 108 and manages the distribution of tasks (e.g., workload) across the virtual databases and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
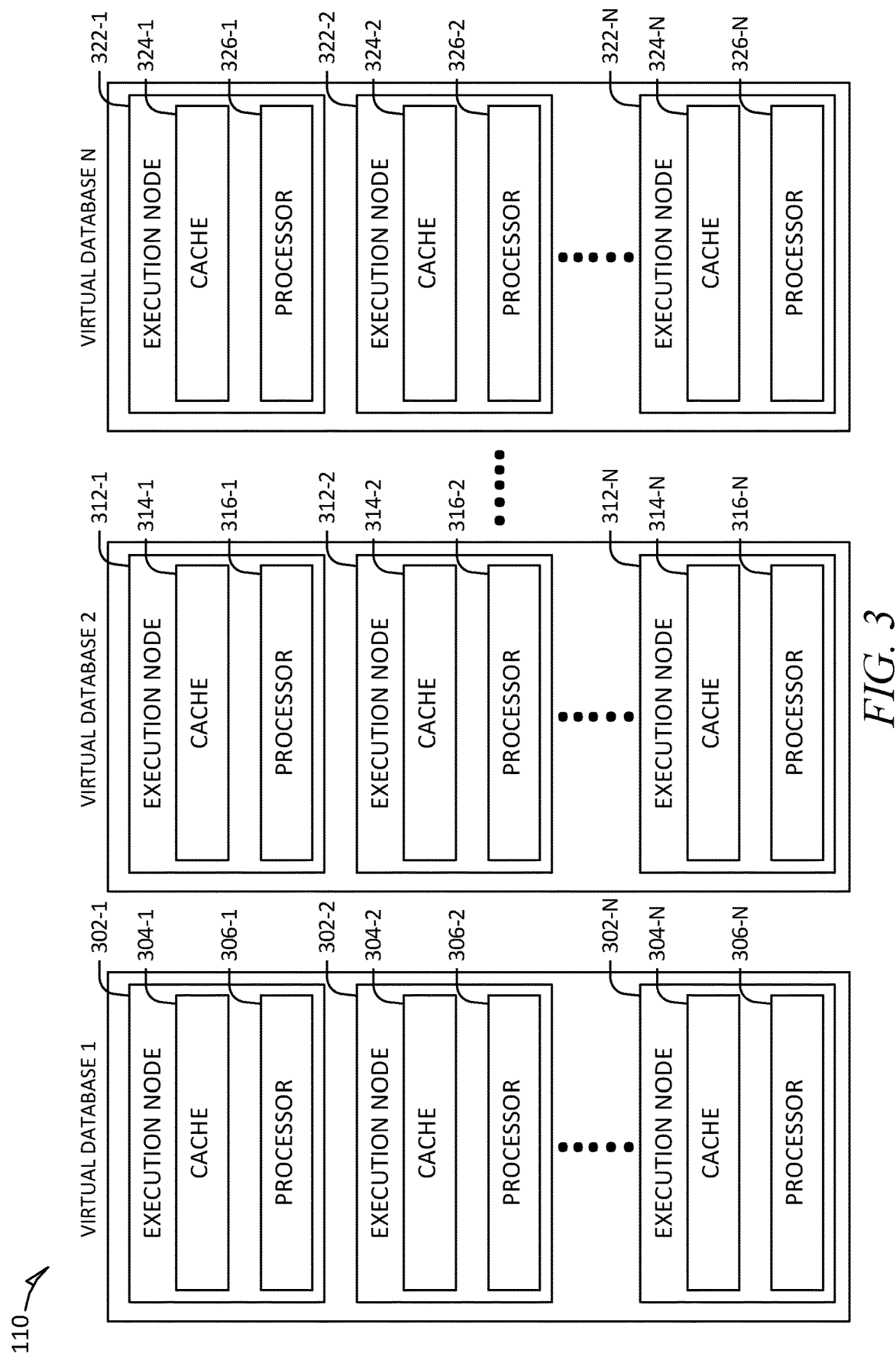
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual database, including virtual database 1, virtual database 2, and virtual database n. Each virtual database includes multiple execution nodes that each include a data cache and a processor. The virtual database can execute multiple tasks in parallel by using the multiple execution nodes. As discussed herein, the execution platform 110 can add new virtual database and drop existing virtual database in real-time based on the current processing needs of the systems and users. This flexibility allows the execution platform 110 to quickly deploy large amounts of computing resources when needed without being forced to continue paying for those computing resources when they are no longer needed. All virtual databases can access data from any data storage device (e.g., any storage device in cloud storage platform 104).

Although each virtual database is shown in FIG. 3 includes three execution nodes, a particular virtual database may include any number of execution nodes. Further, the number of execution nodes in a virtual warehouse is dynamic, such that new execution nodes are created when additional demand is present, and existing execution nodes are deleted when they are no longer necessary.

Each virtual database is capable of accessing any of the data storage devices of the storage platform 104, shown in FIG. 1. Thus, the virtual databases are not necessarily assigned to a specific data storage device and, instead, can access data from any of the data storage devices within the cloud storage platform 104. Similarly, each of the execution nodes is shown in FIG. 3 can access data from any of the data storage devices in the storage platform 104. In some embodiments, a particular virtual database or a particular execution node may be temporarily assigned to a specific data storage device, but the virtual database or execution node may later access data from any other data storage device.

In the example of FIG. 3, virtual database 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual database may handle data storage and data retrieval tasks associated with an internal service, such as a clustering service, a materialized view refresh service, a file compaction service, a storage procedure service, or a file upgrade service. In other implementations, a particular virtual database may handle data storage and data retrieval tasks associated with a particular data storage system or a particular category of data.

Similar to virtual database 1 discussed above, virtual database 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual database 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes are shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes are shown in FIG. 3 each includes one data cache and one processor, alternative embodiments may include execution nodes containing any number of processors and any number of caches. Additionally, the caches may vary in size among the different execution nodes. The caches are shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual databases 1, 2, and n are associated with the same execution platform 110, the virtual databases may be implemented using multiple computing systems at multiple geographic locations. For example, virtual database 1 can be implemented by a computing system at a first geographic location, while virtual databases 2 and n are implemented by another computing system at a second geographic location. In some embodiments, these different computing systems are cloud-based computing systems maintained by one or more different entities.

Additionally, each virtual database is shown in FIG. 3 as having multiple execution nodes. The multiple execution nodes associated with each virtual database may be implemented using multiple computing systems at multiple geographic locations. For example, an instance of virtual database 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual database.

Execution platform 110 is also fault tolerant. For example, if one virtual database fails, that virtual database is quickly replaced with a different virtual database at a different geographic location.

A particular execution platform 110 may include any number of virtual databases. Additionally, the number of virtual warehouses in a particular execution platform is dynamic, such that new virtual warehouses are created when additional processing and/or caching resources are needed. Similarly, existing virtual databases may be deleted when the resources associated with the virtual warehouse are no longer necessary.

In some embodiments, the virtual databases may operate on the same data in cloud storage platform 104, but each virtual database has its own execution nodes with independent processing and caching resources. This configuration allows requests on different virtual warehouses to be processed independently and with no interference between the requests. This independent processing, combined with the ability to dynamically add and remove virtual databases, supports the addition of new processing capacity for new users without impacting the performance observed by the existing users.

Figure 4:
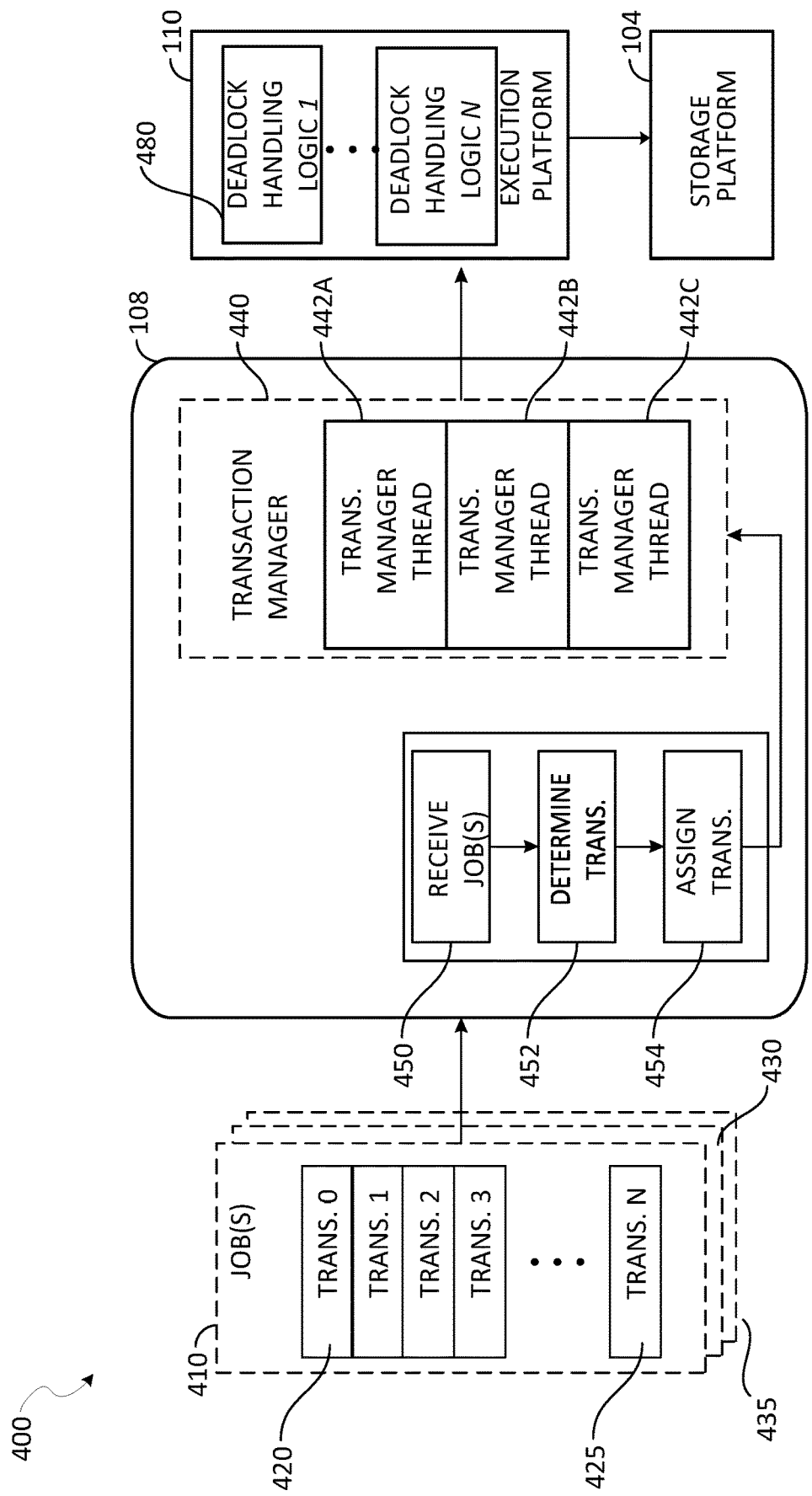
FIG. 4 is a computing environment conceptually illustrating an example software architecture for managing and executing concurrent transactions on a database system, in accordance with some embodiments of the present disclosure.

FIG. 4 is a computing environment 400 conceptually illustrating an example software architecture for managing and executing concurrent transactions on a database system (e.g., the network-based database system 102), which can be performed by a given execution node of the execution platform 110, in accordance with some embodiments of the present disclosure. In an embodiment, a process flow is performed by a transaction manager that is configured to manage and execute transactions as described further herein.

As shown, the transaction manager 440 is included in the compute service manager 108. The transaction manager 440 receives a job 410 that may be divided into one or more discrete transactions 420-425, e.g., transaction 0, transaction 1, transaction 2, transaction 3, and so forth through transaction (n). In an embodiment, each transaction includes one or more tasks or operations (e.g., read operation, write operation, database statement, user defined function, and the like) to perform. The transaction manager 440 receives the job at 450 and determines transactions at 452 that may be carried out to execute the job 410. The transaction manager 440 is configured to determine the one or more discrete transactions, such as transaction 0, transaction 1, transaction 2, transaction 3, and so forth, based on applicable rules and/or parameters. The transaction manager 440 assigns transactions at 454.

As further shown, the transaction manager 440 is configured to concurrently process multiple jobs that can be performed by the execution platform 110. In an example, the transaction manager 440 can receive a second job 430 or a third job 435, each of which include respective discrete transactions that are to be performed on the execution platform 110. Each of the transactions may be executed concurrently by the execution platform 110 in which different operations are performed (e.g., a respective read operation or write operation are executed from each of the transactions by the execution platform 110).

In an implementation, the job 410, including the respective transactions therein, is carried out by the transaction manager 440 which can perform the responsibilities of a query manager (e.g., processing query statements and operations, and the like). As shown, the transaction manager 440 may have multiple threads, including, for example, transaction manager threads 442A, 442B, 442C, and so forth. The transaction manager 440 may assign the job 410, including the multiple discrete transactions, to a particular virtual database of the execution platform 110. Based on this assignment, the transaction manager 440 can send the job 410, including the multiple discrete transactions, to the assigned virtual database for execution. Alternatively, the transaction manager 440 can send a subset of the transactions included in the job 410 for execution by the execution platform 110.

In an embodiment, as described further herein, the transaction manager 440 can perform operations to process transactions (e.g., OLTP) that may be executing concurrently, while handling conflicts and avoiding starvation of resources. Further, as described further herein, the transaction manager 440 handles conflicts between multiple transactions and concurrency issues that can arise when multiple transactions are executing in parallel on the execution platform 110. As further shown, the execution platform 110 communicates with the storage platform 104, which provides a distributed database (e.g., Foundation Database (FDB), and the like), where data can be read and written in connection with performing the transactions.

In an embodiment, the transaction manager 440 schedules and manages the execution of transactions on behalf of a client account. The transaction manager 440 may schedule any arbitrary SQL query included in a given transaction. The transaction manager 440 may assume a role to schedule the job 410 as if it is the client account rather than as an internal account or other special account. The transaction manager 440 may embody the role of, for example, an account administrator or a role having the (smallest) scope necessary to complete the job 410. In an embodiment, the transaction manager 440 embodies the role that owns the object that is the target of the job 410 (e.g., for a cluster, the table being clustered is the target).

In an embodiment, the transaction manager 440 determines transactions at 452 and assigns transactions at 454 that are to be performed to fully execute the job 410. In an embodiment, the transaction manager 440 assigns ordering constraints to any number of the one or more discrete transactions, where applicable. Depending on the constraints of the job 410, the transaction manager 440 may determine that one or more of multiple discrete transactions are to be serialized and executed in a particular order.

In an embodiment, the transaction manager 440 generates a report indicating when the job 410 is scheduled to be executed and how much computing resources are estimated to be tied up executing the job 410. The transaction manager 440 may alert a client account when the job 410 is being executed.

The database system provides concurrency control and isolation for executing transactions against (e.g., a series of SQL Statements within a SQL Transaction) against linearizable storage (e.g., a linearizable key-value store, NoSQL database, an OLAP database or data warehouse). A transaction as referred to herein includes a group of operations executed atomically. In an example, such transactions may include read and write operations but can also include operations such as increment, decrement, compare-and-swap, and the like. Further, it is appreciated that linearizable storage may include any type of distributed database (e.g., Apache HBase).

The following discussion relates to transactions in a given distributed database system. In an example, the transaction manager 440 utilizes a linearizable storage, provided by the storage platform 104, for managing and processing transactions as described herein. In an embodiment, the transaction manager 440 implements a read committed model for performing transactions. As referred to herein, a read committed model can refer to a model that ensures that all read operations performed in a given transaction sees a consistent snapshot of the database (e.g., reading a last set of committed values that existed when the read operation commenced), and the transaction itself successfully commits only if no updates that the transaction has made results in write-write conflicts with any concurrent transactions.

As discussed further herein, the transaction manager 440 implements a two-level transaction hierarchy, where a top-level transaction corresponds to a SQL transaction, and a nested transaction corresponds to a SQL statement within the parent SQL transaction. A given nested transaction can perform operations, such as reads and writes, and can perform a rollback and restart execution zero or more times before succeeding. Upon transaction commit, write operations can become visible, and write locks held by each contained statement can be released.

As mentioned before, the subject system provides concurrency control and isolation for executing a series of SQL Statements within a SQL Transaction against a linearizable storage. As discussed further herein, a transaction manager (e.g., transaction manager 440) is configured to provide a concurrency control mechanism that can be understood as a combination of multi-version concurrency control for read operations (MVCC) and locking for write operations. The subject system provides techniques for read committed isolation where each statement may execute against a different snapshot of the database (e.g., the storage platform 104), with write locks held until transaction commit.

In an embodiment, the linearizable storage as described herein enables each operation to execute atomically between invocation and response. As an example, such a linearizable key-value store ensures that operations execute in an atomic manner consistent with a "real-time" ordering of those operations e.g., when operation A completes before operation B begins, operation B should take effect after operation A. In the context of a database, a first write operation to a row in the table takes effect before a second write or read operation to the same row in the table if the second operation was issued after the first completed.

The examples described herein relate to linearizable storage such as a linearizable database, including, for example, NoSQL systems, and the like. A given NoSQL database refers to a database that stores data in a format other than a tabular format, and can store data differently than in relational tables. Further, Uber's Schemaless is an example of building linearizable Key-Value storage via having a "key" and "value" column in a relational table. Other examples of linearizable databases are: HBase, RocksDB, TiKV, Redis, Etcd.

Some examples of optimizations provided by the subject system include utilizing restricted transactional capabilities offered by some embodiments of storage platform 104, such as FoundationDB, that can be leveraged to enable a more efficient transaction implementation. For example, in a write (/lock/delete) protocol, a write operation is performed, and then a read operation is done to check for (1) any write operation that happened before the write request was submitted (2) any other write operation was submitted concurrently with the write operation that was serialized before. The following example illustrates the above:

T1 starts statement S1
   S1 starts a FoundationDB Transaction, and uses its Read Version as the Read Timestamp
   S1 wishes to write object X, so it first reads object X as of the Read Timestamp
   Finding no conflicts, S1 writes X, using a timestamped operation to embed the commit timestamp in the key and setting IsCommitEmbedded.
   S1 sets a read conflict range on the FoundationDB transaction for all keys with a prefix of X
   S1 writes a transaction status entry for ID, directly setting it to committed.
   T1 commits the FoundationDB Transaction.

If the transaction commits, then there were no concurrent conflicting transactions.

If the transaction is aborted, then there was a concurrency conflicting transaction for one of the writes that were done. None of S1's writes, nor the transaction status entry will be persisted. S1 now restarts in the slow path.

In an example, a "read version" refers to a "version" or state of the database that corresponds to when a last operation was successfully committed to the database.

The following relates to a discussion of strict serializability. Whereas linearizability makes a "real-time" ordering and atomicity promise about single operations, strict serializability makes a "real-time" ordering and atomicity promise about groups of operations. In an example, the group of operations is submitted incrementally over time, with a terminal "commit" command being issued. The strictly serializable storage platform may employ techniques such as pessimistic lock-based exclusion or an optimistic validation phase to enable this functionality. In this example, the group of operations is referred to as a transaction as mentioned herein. The subject system can impose restrictions on the transaction, such as the number, size, or duration of the operations, and always reject transactions that exceed these limits.

In an embodiment, read operations may be optimized in the following manner. When reading with a given read timestamp, it may not be feasible for any transaction started after the read timestamp to commit before the read timestamp. Thus, if the Transaction ID is set to be the same as the first statement's read timestamp, then instead of reading [X.0, X.inf], the subject system can read [X.0, X.readTimestamp]. Consequently, this approach can make read operations for old or frequently written data more efficient.

In an embodiment, the subject system implements a two-level transaction hierarchy, where the top-level transaction corresponds to a SQL Transaction, and the nested transaction (referred to as a "StatementContext") corresponds to a SQL statement within the parent SQL Transaction. A given StatementContext performs read and write operations and may be instructed to perform a rollback and restart execution zero or more times before succeeding. In an example, transactions control the collective visibility of all write operations from successful statements. Upon transaction commit, all write operations become visible, and all write locks held by each contained statement are released.

In an embodiment, each object key is associated with a stamp that uniquely identifies a single execution attempt of a statement, which can be by appending a three-part tuple of (Transaction ID, statementNumber, restartCount). The higher order component is the transaction identifier assigned to the SQL-level transaction. The statementNumber identifies the SQL statement within the SQL-level BEGIN/COMMIT block. The restart count tracks which statement restart attempt generated this write operations. A StatementContext is instantiated with this stamp, and applies it to all writes performed through the StatementContext instance.

Stamping keys this way has a number of desirable properties. First, if key1<key2, then key1·suffix1<key2·suffix2, regardless of the values of suffix1 and suffix2. If key1==key2, then the transactionID component of the suffix allows us to resolve the commit status of the object to determine its visibility to the statement. If transactionID1==transactionID2, then Statement Number allows statements to see writes performed by previous statements within the same transaction. The restartCount component of the suffix enables the system to detect and delete obsolete versions of the object that had been left around when a statement has to be restarted.

In a similar fashion each execution of a statement is given a three-part identifier consisting of the statement's readTimestamp (RTS) and the current values of statementNumber (SN) and restartCount (RC). This approach ensures that each statement that is part of the execution of a SQL statement (or more generally a SQL Transaction), sees either data committed before the SQL statement started or by data written or updated by the transaction itself.

In an embodiment, the transaction manager employs a Transaction Status Table (TST) to keep track of committed and aborted transactions. The TST is a persistent hashmap that maps Transaction ID to its metadata, most notably a list of finalized statement numbers and their final restart count, and the commit outcome including the transaction's commit timestamp (CTS). Transactions that are in progress do not exist in the Transaction Status Table. In an embodiment, the TST can be stored in the storage platform 104, or within memory or cache of the execution platform 110.

The following discussion relates to a read protocol that is utilized by the transaction manager 440.

In an embodiment, the transaction manager 440 uses a read committed transaction isolation level, and each statement may be run with a different read timestamp. In an example, the read request for a given key (or a range of keys) is implemented by executing a linearizable storage read call for all keys with X as their prefix. The call returns versions of X with their stamps and values. The read method returns either the latest version of X made by a transaction that committed before the SQL statement started or which was written by the most recent statement of the transaction itself that was not canceled (if any).

The following discussion relates to a write protocol that is utilized by the transaction manager 440.

In an embodiment, the write protocol checks both for WW (write-write) conflicts and WW deadlocks. The following example describes a single transaction and no conflicts. Assume that object X initially has a stamp of TXN1.0.0 and was committed at timestamp 10. In the following example, it should be understood that the following transactional steps described further below can be done within one transaction, and collectively committed. On failure, or upon exceeding the limitations of the underlying transactional system, the execution can fall back to issuing the operations individually as described in further detail below.

T2 starts and creates S1 of StatementContext(ID=TXN2, Statement Number=1, restartCount=0)

Assume that the constructor obtains a read timestamp from the linearizable storage of 15 by contacting the clock service 130. As mentioned before, the clock service 130 is a component of the storage platform 104 which can be contacted to fetch a number that will be greater than any number previously returned, such as one that correlates to the current time. In an embodiment, clock service 130 is provided separately and is independently contactable from the linearizable storage, or can be integrated into the linearizable storage such that the clock value may be inserted into a written value. The latter operation will be referred to as a timestamped write.

To update the value of X, the following sequence of actions is performed in an embodiment:

```
{
    S1 does a linearizable storage write for X.TXN2.1.0 with a value of 100
    // The next step is for S1 to check for WW (write-write) conflicts by checking whether there is
    // another transaction that has updated X between the RTS and S1's write.
    S1 issues the range read [X.0, X.inf] to obtain the set all versions of X and their stamps
    The read returns [X.TXN1.0.0, X.TXN2.1.0].
    S1 looks up TXN1 in the Transaction Status Table, finds a commit timestamp of 10.
    10 is earlier than our read timestamp of 15, so it is not a conflict.
    S1 ignores [X.TXN2.1.0] as it belongs to S1
    // Assume for now, there were no conflicts detected
    S1 finalizes, and records (statement number=1, restart count=0) into the transaction
    status table for TXN2
}
```

T2 commits. This will cause the Transaction Status Table record to be updated in linearizable storage to reflect that TXN2 is now committed and its commit timestamp of 20.

At this point there will be two versions of X, one stamped with TXN1.0.0 and the other TXN2.1.0. Subsequent transactions that read X can determine if this new version of X was written by a committed transaction by reading the transaction status record, and determine the CTS of the transaction. The write protocol for transaction T can now be stated.

In an implementation, each row (object) updated uses two separate linearizable storage transactions:

1) The first linearizable storage transaction of T inserts a new version of the object with its key X suffixed with three-part suffix (T.ID, T. statementNumber, T.restartCount).
2) The second linearizable storage transaction issues a range read with the prefix "X." to obtain the SCT (set of conflicting transactions). The result set is a list of committed or active transactions that wrote (or are writing) new versions of X.

There are a number of possible distinct outcomes to this linearizable storage read call that are evaluated in the following order:

1) SCT is empty in which case T is trivially allowed to proceed.
2) SCT is not empty, but for all Ti in SCT, Ti has committed before T's read timestamp, and thus are not WW (write-write) conflicts. T may proceed.
3) SCT is not empty; for all Ti in SCT, Ti is committed; and there exists a Ti in SCT, such that its CTN is greater than T's read timestamp. T is permitted to restart without delay.
4) SCT is not empty, and for one or more Ti in SCT, Ti has not yet committed or aborted. T waits for all transactions in SCT to complete before restarting the current statement.
5) SCT is not empty, and for one or more Ti in SCT, Ti.TransactionID is the same as our own transaction ID, and Ti.StatementCount is less than our current statement count. This means that currently the lock is held, as a previous statement took it and successfully finished its execution. T may proceed.
6) SCT is not empty, and for one or more Ti in SCT, TI.TransactionID is the same as our own transaction ID, Ti.StatementCount is the same as our own StatementCount, and Ti.RestartCount is less than our own restart count. This is a lock from a previous execution of our own transaction, thus T holds the lock on this row, and T may proceed.

For all cases, the object (X.Stamp, Value) will be left in the database (e.g., the storage platform 104). For (3) and (4) which require restarts, the object is left to serve as a write lock. In general, all tentative writes for an object X will form a queue of write locks. (5) and (6) illustrate the cases where previously left write locks allow subsequent statements or restarts of a statement to recognize that they already hold the lock that they wish to take.

The following discussion describes an example that illustrates a write-write (WW) conflict. A write-write conflict, which is also understood as overwriting uncommitted data, refers to a computational anomaly associated with interleaved execution of transactions. To simplify the example, stamps are omitted. Assume that before either T1 or T2 starts that object X has a value of 500, a stamp of TXN1.0.0, and a CTN of 10.

T1 starts and gets a read timestamp of 15
T2 starts and gets a read timestamp of 20
T2 writes (key=X.T2, value=100)
T2 issues a linearizable storage read with range [X.0, X. Inf]. The set SCT will be empty so T2 continues
T1 writes (key=X.T1, value=50)
T1 issues a linearizable storage read with range [X.0, X. Inf]. The set SCT will contain T2 so T1 must restart
T2 successfully commits. T1's CTN for X will be >20. Assume it is 21
After waiting until T2 either commits or aborts, T1 restarts the statement with a read TS>21.

The following discussion relates to a delete protocol utilized by the transaction manager 440.

In an embodiment, delete operations are implemented as a write of a sentinel tombstone value; otherwise, delete operations employ the same protocol as write operations. When a read operation determines that the most recently committed key is a tombstone, it considers that key to be non-existent.

The following discussion relates to a lock protocol utilized by the transaction manager 440.

To support a query statement of SELECT . . . FOR UPDATE, the transaction manager API offers StatementContext::lock(Key), which allows rows to be locked without writing a value to them. The implementation of lock( ) follows the write protocol, except that it writes a special sentinel value to indicate the absence of a value (distinct from SQL NULL). A SELECT . . . FOR UPDATE statement may also be forced to restart several times before the statement finishes successfully. Once it does, subsequent statements in the transaction will recognize the existence of this key as an indication that they hold the lock (in accordance with cases (5) and (6) above). All reads can ignore the key as a write.

The following discussion relates to determining whether to commit, abort, or restart a given transaction which can be determined by the transaction manager 440.

When a transaction finishes its execution, it will either have an empty SCT, indicating that the commit can proceed, or an SCT with one or more conflicting transactions, indicating that the transaction will need to restart.

When a statement is restarted, all writes stamped with a lower restartCount are left in the database (e.g., the storage platform 104) as provisional write locks for the next execution. The next execution of the statement might write a different set of keys. The set difference between the first and second execution form a set of orphaned writes that are removed and never become visible. The statement itself may not be relied upon to always be able to clean up its own orphaned writes, as in the event of a process crash, the location of the previous writes will have been forgotten. Finalizing statements and recording the restart count of the successful execution promises that only the results of one execution will ever become visible, and permits orphaned writes to be lazily cleaned up.

A transaction is committed, and all of its writes made visible, by inserting its Transaction ID into the Transaction Status Table. The commit timestamp is filled in by the clock service 130 or directly by the distributed database (e.g., FoundationDB), such that it is higher than any previously assigned read or commit timestamps. All writes are completed before a statement may be finalized, and all statements are finalized before the transaction may be committed.

A transaction is aborted by inserting its Transaction ID into the Transaction Status Table, with its transaction outcome set as aborted. The list of finalized statements and their restart counts will be reset to an empty list. The insertion into the Transaction Status Table will make the abort outcome visible to all conflicting transactions, and all writes performed by finalized statements may be proactively or lazily removed from the database (e.g., the storage platform 104).

When a statement tries to finalize with a non-empty SCT, it waits for commit outcomes to be persisted to the Transaction Status Table for all conflicting transactions. Once all conflicting transactions have committed or aborted, then the transaction will begin its restart attempt.

The following discussion relates to an API (e.g., the transaction manager API as referred to below) that can be utilized (e.g., by a given client device) to send commands and requests to the transaction manager 440.

A SQL transaction contains a sequence of one or more SQL statements. Each SQL statement is executed as a nested transaction, as implemented by the transaction manager StatementContext class. Each transaction manager statement itself is executed as one or more database transactions.

In an embodiment, the transaction manager API is divided into two parts: 1) the data layer, which provides a read and write API to the transaction execution processes; and 2) the transaction layer, which provides, to the compute service manager 108, an API to orchestrate the transaction lifecycle. In an implementation, transactions operate at a READ COMMITTED isolation level and implement MVCC on top of the distributed database (e.g., storage platform 104) to avoid taking any read locks.

Consider the following example SQL query:
Update emp.Salary=emp.Salary*1.1 where emp.Dept="shoe";

In an example, an instance of the StatementContext class will be created to execute this SQL statement. The constructor contacts the linearizable storage transaction manager to begin a linearizable storage transaction and obtain a linearizable storage STN which is then stored in the readTimestamp variable.

The Update operation then executes across any number of execution nodes, all using the same StatementContext instance. In an example, a function rangeRead( ) will be used to scan the base table (e.g., base KV table), or an index on Dept, for the tuples to update. A series of write( ) calls will be made to update the salary of all matching employees.

A call to finalize( ) will return CONFLICT if the statement encountered any conflicts during its execution, to indicate that re-execution is needed. The key to restarts making progress is that the first execution of the statement will have the side effect of, in effect, setting write locks on the objects being updated. This ensures that when the statement is re-executed the necessary writes locks have already been obtained and the statement will generally (but not always).

Next, consider an example illustrating Write-Write conflicts between 3 transactions:
T1 starts S1 with timestamp 10
T2 starts S2 with timestamp 20
T3 starts S3 with timestamp 30
S1 writes X
S2 writes Y
S3 writes Z
S1 writes Y, and notes the conflict with T2
S2 writes Z, and notes the conflict with T3
S3 writes X, and notes the conflict with T1

In this case described above, three transactions are involved in a deadlock. Each statement believes that it should restart and wait for the execution of the previous transaction to finish. No transaction has the complete information to know that it is involved in a deadlock.

Thus, when a statement fails to finalize due to conflicts, it instead writes its conflict set into the database (e.g., the storage platform 104). These conflict sets may be read by all other transactions, allowing them to detect a cycle in the waits-for graph, indicating that they're involved in a deadlock.

In database systems, a deadlock can refer to a situation where two or more transactions are waiting for one another to give up locks. As an example, deadlocks can be handled by deadlock detection or prevention in some embodiments. The following discussion relates to example mechanisms for handling deadlocks utilizing distributed approaches that do not require a centralized deadlock handling component or implementation. For example, in an implementation, a particular execution node, (e.g., execution node 302-1 and the like) in the execution platform 110 can perform at least some of the following operations described below.

Deadlock detection: A basic idea of deadlock detection is to detect a deadlock after the deadlock occurs such that that a particular transaction can be aborted. This can be done by finding cycles in a wait-for graph. Depending on how deadlock detection is performed, deadlock detection can be classified as:
  Online detection: whenever a transaction wishes to acquire a lock, it adds an edge to the wait-for graph. The transaction is aborted if this new edge will cause a cycle.
  Offline detection: the system periodically collects the pending lock requests from all transactions to construct a wait-for graph and perform cycle detection.

Deadlock prevention: A basic idea of deadlock prevention is to enforce some restrictions on locking so that deadlocks can never happen. Example techniques include:
  Timeout: a transaction is assumed to be involved in a deadlock if its lock request cannot be granted after a certain time period, e.g., 5 seconds.
  Non-blocking 2PL: whenever a conflict happens, a transaction is aborted immediately.
  Wait-die: when a transaction Ti requests a lock that is held by Tj, Ti is only allowed to wait if Ti is older than Tj. Otherwise Ti is aborted immediately.
  Wound-wait: when a transaction Ti requests a lock that is held by Tj, Tj is aborted if Ti has a higher priority than Tj. Otherwise, Ti will wait.

In embodiments, the database system implements a distributed database (e.g., storage platform 104) for executing distributed transactions, and utilizes locking for concurrency control where any deadlocks are handled in a distributed manner by a particular execution node executing a particular transaction (e.g., execution node 302-1 and the like).

In some embodiments, the database system provides the following:

No false deadlocks: Deadlocks generally represent some bugs in the user's application code. By providing accurate and informative deadlock information, embodiments of the database system enables a user to fix these deadlocks.

Distributed/decentralized deadlock handling: transaction manager 440 is designed for executing distributed transactions in the cloud. In an embodiment, the transaction manager 440 creates one job (with one or more execution node workers) to execute a transaction. It can be desirable that each transaction handles deadlocks independently without requiring a centralized transaction manager.

The following discussion describes a deadlock detection and resolution protocol for the database system to meet the two aforementioned requirements. In order to meet the goal of no false deadlocks, the database system performs deadlock detection on the wait-for graph and only aborts a transaction if it finds a cycle in the graph. To meet a goal of not utilizing a centralized transaction manager, each transaction (e.g., executing on a given execution node) are able to exchange wait-for information and perform deadlock detection independently. Further, the database system implements a deadlock detection algorithm that is deterministic so that all transactions can unanimously agree on which transactions to abort.

In the following discussion, it is understood that statements in a transaction are executed serially e.g., one at a time. As discussed further below, the database system can then extend a deadlock detection protocol as described herein to support parallel statement execution.

In the discussion below, "transaction" and "statement" are used interchangeably because it is assumed that statements of a transaction will be executed serially, e.g., one at a time. In an example, the database system utilizes a deadlock detection and resolution protocol that enables transactions to store their wait-for information into a dedicated table in a distributed database (e.g., storage platform 104). A transaction waiting for conflicting transactions can periodically run a deterministic deadlock detection algorithm. If a transaction determines that it is a victim in a deadlock, the transaction can abort itself so that other transactions can proceed.

In some implementations, the execution platform 110 can provide deadlock handling logic 480 (e.g., deadlock handling logic 1 to deadlock handling logic N, which can correspond respectively to each transaction 420 to transaction 425) which implements the deadlock detection and resolution protocol mentioned herein, and is provided or utilized by each given execution node that is currently executing a given transaction(s). In another embodiment, each deadlock handling logic can be provided to a corresponding transaction (or statement within a transaction) for deadlock detection and resolution as described further herein.

In an embodiment, wait-for information of transactions is stored in a wait-for table in the distributed database (e.g., storage platform 104). The wait-for table includes a set of key-value pairs where both keys and values are transaction IDs. A key-value pair <Ti, Tj> means that Ti is currently waiting for Tj, e.g., there is an edge Ti→Tj in the wait-for graph.

In order to satisfy the deterministic requirement, each transaction Ti reports Ti→Tj only if Tj is the oldest conflicting transaction that Ti is waiting for (a transaction's age is determined by its transaction ID, e.g., a younger (e.g., newer) transaction will have a larger transaction ID). By ensuring that there is at most one ongoing edge from each transaction, it is straightforward to see that each transaction can participate in at most one cycle. Thus, the youngest transaction (with the largest transaction ID) can be aborted in each cycle to deterministically resolve deadlocks.

Figure 5:
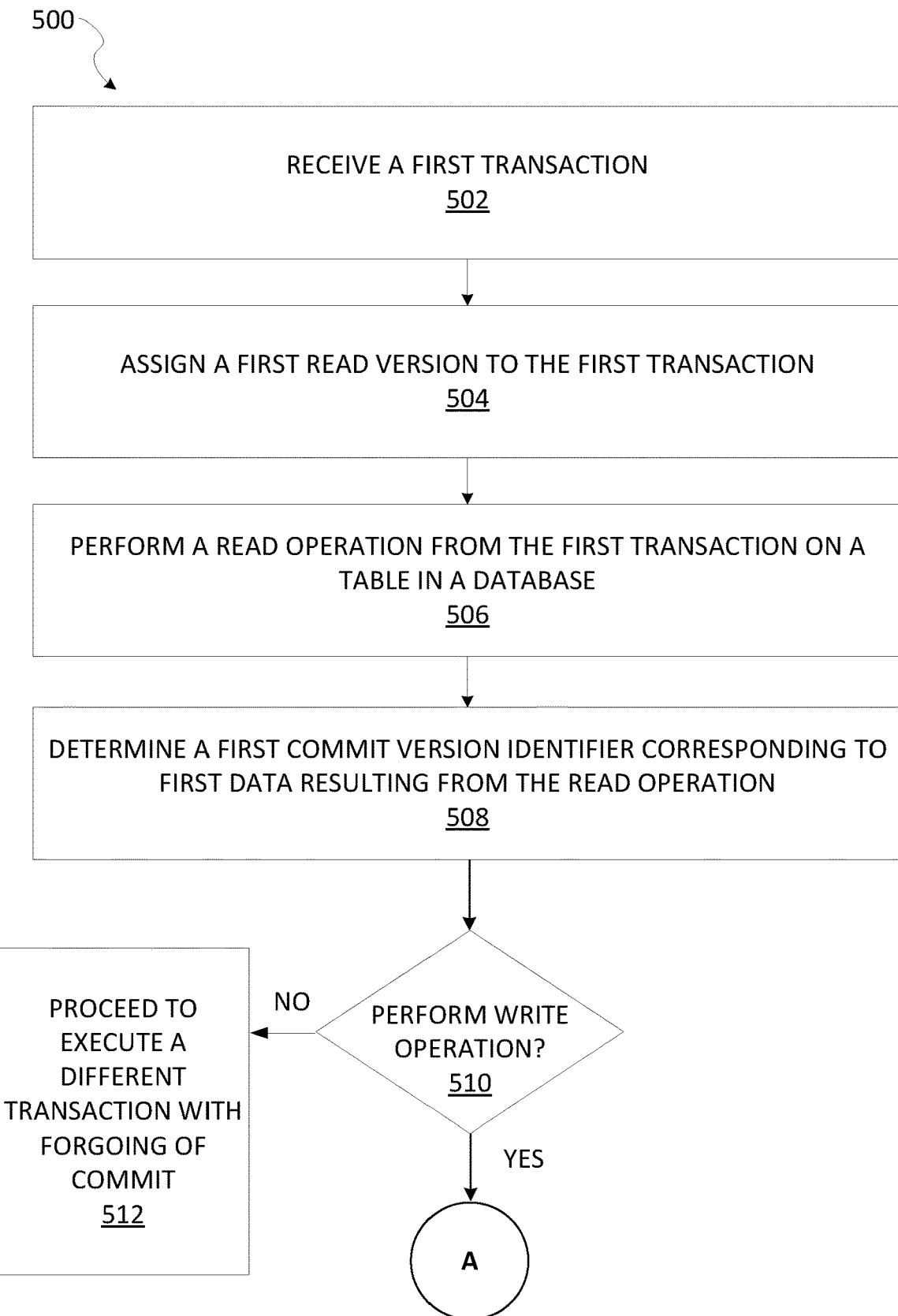
FIG. 5 is a flow diagram of a method for implementing database transactions, in accordance with some embodiments of the present disclosure.

FIG. 5 is a flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based database system 102, such as components of the compute service manager 108 or a node in the execution platform 110. Accordingly, the method 500 is described below, by way of example with reference thereto. However, it shall be appreciated that the method 500 may be deployed on various other hardware configurations and is not intended to be limited to deployment within the network-based database system 102.

At operation 502, the transaction manager 440 receives a first transaction that is to be executed on linearizable storage.

At operation 504, the transaction manager 440 assigns a first read version to the first transaction. The first read version indicates a first version of the linearizable storage. Alternatively, a read timestamp can be retrieved from a clock service (e.g., the clock service 130), and a transaction identifier can be assigned to the first transaction where the transaction identifier corresponds to a read start time.

At operation 506, the transaction manager 440 performs a read operation from the first transaction on a table in a database.

At operation 508, the transaction manager 440 determines a first commit version identifier corresponding to the first data resulting from the read operation.

At operation 510, the transaction manager 440 determines whether a particular write operation is included in the first transaction. If the particular write operation is to be performed with the first transaction, then the transaction manager 440 proceeds to perform a method as described below in FIG. 7.

Alternatively, when the transaction manager 440 determines that a particular write operation is absent from the first transaction, at operation 512, the transaction manager 440 proceeds to execute a different transaction (along with forgoing performance of a commit process for the first transaction). It is appreciated that due to the concurrency of transactions that are performed, the operations described further below in FIG. 6 can be executed at any time during the operations described in FIG. 5 above.

Figure 6:
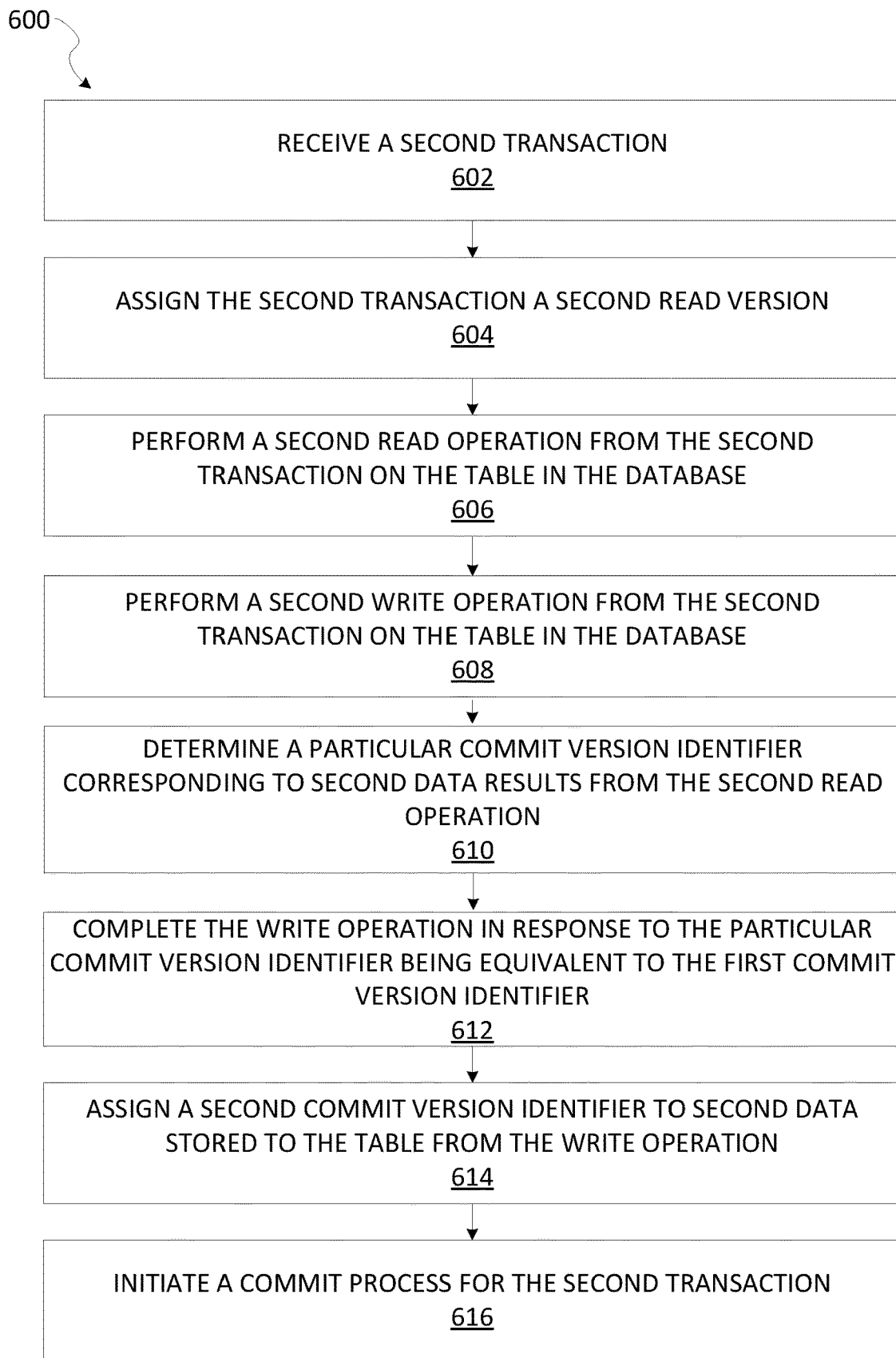
FIG. 6 is a flow diagram illustrating operations of a database system in performing a method, in accordance with some embodiments of the present disclosure.

FIG. 6 is a flow diagram illustrating operations of a database system in performing a method, in accordance with some embodiments of the present disclosure. The method 600 may be embodied in computer-readable instructions for execution by one or more hardware components (e.g., one or more processors) such that the operations of the method 600 may be performed by components of network-based database system 102, such as components of the compute service manager 108 or a node in the execution platform 110. Accordingly, the method 600 is described below, by way of example with reference thereto. However, it shall be appreciated that the method 600 may be deployed on various other hardware configurations and is not intended to be limited to deployment within the network-based database system 102.

In some embodiments, the method 600 can be performed in conjunction with the method 500 as discussed above. For example, the method 600 can be performed after the operations of the method 500 or performed substantially concurrently with the method 500. At operation 602, the transaction manager 440 receives a second transaction to be executed on linearizable storage. At operation 604, the transaction manager 440 assigns the second transaction a second read version that indicates a second version of the linearizable storage. At operation 606, the transaction manager 440 performs a second read operation from the second transaction on the table in the database. At operation 608, the transaction manager 440 performs a second write operation from the second transaction on the table in the database. At operation 610, the transaction manager 440 determines a particular commit version identifier corresponding to second data results from the second read operation. At operation 612, the transaction manager 440 completes the write operation in response to the particular commit version identifier being equivalent to the first commit version identifier. At operation 614, the transaction manager 440 assigns a second commit version identifier to second data stored to the table from the write operation, the second commit version identifier corresponding to a second version of data in the table. The second commit version identifier is different than the first commit version identifier. At operation 616, the transaction manager 440 initiates a commit process for the second transaction.

Figure 7:
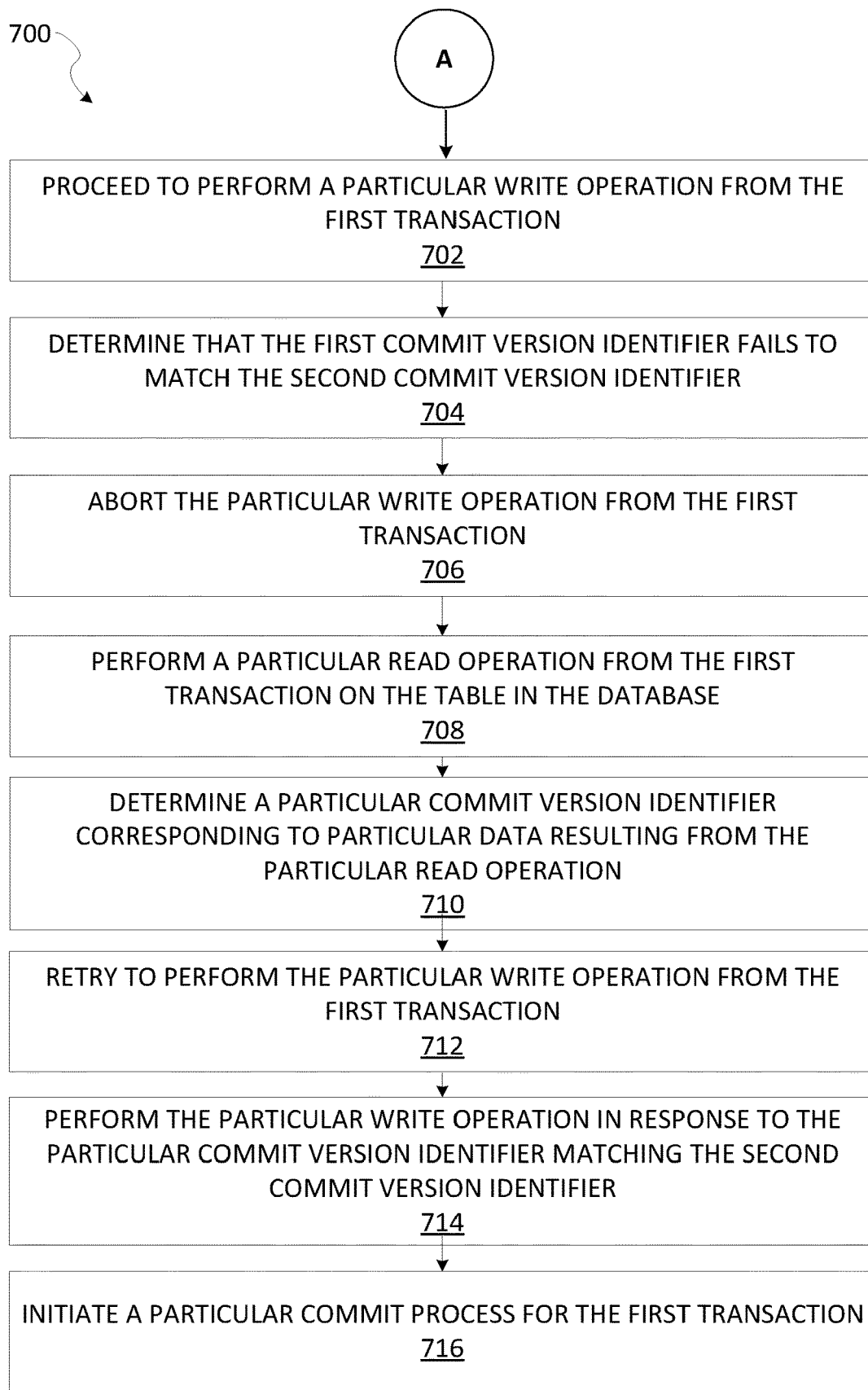
FIG. 7 is a flow diagram illustrating operations of a database system in performing a method, in accordance with some embodiments of the present disclosure.

FIG. 7 is a flow diagram illustrating operations of a database system in performing a method, in accordance with some embodiments of the present disclosure. The method 700 may be embodied in computer-readable instructions for execution by one or more hardware components (e.g., one or more processors) such that the operations of the method 700 may be performed by components of network-based database system 102, such as components of the compute service manager 108 or a node in the execution platform 110. Accordingly, the method 700 is described below, by way of example with reference thereto. However, it shall be appreciated that the method 700 may be deployed on various other hardware configurations and is not intended to be limited to deployment within the network-based database system 102.

In some embodiments, the method 700 can be performed in conjunction with the method 500 and the method 600 as discussed above. For example, the method 700 can be performed after the operations of the method 500 or the method 600 (or performed substantially concurrently therewith either method).

At operation 702, the transaction manager 440 proceeds to perform a particular write operation from the first transaction. At operation 704, the transaction manager 440 determines that the first commit version identifier fails to match the second commit version identifier. At operation 706, the transaction manager 440 aborts the particular write operation from the first transaction. At operation 708, the transaction manager 440 performs a particular read operation from the first transaction on the table in the database. At operation 710, the transaction manager 440 determines a particular commit version identifier corresponding to particular data resulting from the particular read operation. At operation 712, the transaction manager 440 retry to perform the particular write operation from the first transaction. At operation 714, the transaction manager 440 perform the particular write operation in response to the particular commit version identifier matching the second commit version identifier. At operation 716, the transaction manager 440 initiates a particular commit process for the first transaction.

As mentioned herein, "KV" refers key-value or key value and can be used interchangeably with "hybrid", "PK" refers to primary key, "FK" refers to foreign key, "DDL" refers to data definition language, and "SI" refers to secondary index of a hybrid table.

In some example embodiments, the hybrid system 230 is configured to perform transactional and analytical workloads (e.g., OLTP and OLAP queries) using hybrid tables. Hybrid tables are relational tables stored in FDB-backed data stores. They offer high performance when it comes to DMLs and primary-key lookups. However, hybrid tables' scan performance drops significantly when a predicate exists only for non-primary key columns. In addition, hybrid tables cannot enforce uniqueness and referential integrity constraints on non-primary-key columns efficiently. Secondary Indexes for hybrid tables are aimed to improve the performance of the aforementioned operations.

Providing index functionality for hybrid (HTAP) tables: The indexes will be used for efficient lookups, updates, and constraint enforcement. Hybrid tables are a novel type of table that can offer good performance for both transactional (OLTP) and Analytical (OLAP) workloads. In the past, customers would require two separate systems for each type of workload and customers of the database system 102 wouldn't have access to indexes.

The hybrid system 230 provides the benefit of running OLTP/OLAP workloads in a single-engine. At the same time, the hybrid system 230 indexes are designed to work with OLAP system of the system 102 and does not require additional data movement. The hybrid system 230 is configured to perform both transactional and analytical workloads in a single hybrid database system, and provides efficient non-primary key lookups and constraint enforcement with transactional guarantees, without compromising analytical performance, in a fully-managed environment.

Hybrid Tables: In some example embodiments, every hybrid (key-value) table is required to have a primary key (PK), which is defined as a subset of its columns. A PK is used to formulate the key used to store each KV record in the FDB-backed Data Store. In turn, all KV records are stored in an ordering dictated by the PK. A KV table's Secondary Index (SI) is an access structure stored in the FDB-backed data store, which aids in performing lookups on non-PK columns efficiently. Since SIs will be used in the same FDB-backed data store, their records are defined as key-value pairs. An SI record's key is different from the PK for the same KV table. For example, assume the following KV table defined as:

CREATE HYBRID TABLE kvtab (
id int primary key, order_date date, user_id int, price float, category string);

The KV table kvtab uses ID as a PK and its records will be stored in an FDB-backed data store. To this end, each record should carry a unique key and a value. In our example, all kvtab records will be stored in the FDB-backed store in the following form:

kvtab record: (100111, 2021-04-30, 5032, 38.22, 'Misc.'), then the FDB-backed representation will be something like:

| Key | Value |
| --- | --- |
| 0x1234567891100111 (kv-table-prefix id-value) | 20210430\|5032\|38.22\|Misc (order_date \| user_id \| price \| category) |

An SI will be a complementary KV table, whose existence is tied to the original KV table. The SI enables fast retrieval of the PK(s) of records satisfying a user-defined property defined on non-key column values. For instance, if an SI is defined on the user_id column, then a valid index mapping would be a function that maps each user_id value to an id value:
kvtab record: (100111, 2021-04-30, 5032, 38.22, 'Misc.'), then the FDB-backed representation of each record for the SI on user_id will be:

| Key | Value |
| --- | --- |
| 0x1234567af1b5032 (si-kv-table-prefix user-id-value) | 100111 (id) |

As discussed, the transaction manager 440 is the transaction management layer for Key-Value/Hybrid Tables, which provide high concurrency and fine-grained transaction management. In some example embodiments, the transaction manager 440 uses multiple version concurrency control for reads and locking for writes to implement the Oracle Read Commit Isolation level. In some example embodiments, locking is implemented by writing a stamped key/value pair into FDB. When there are multiple transactions attempting to lock the same key concurrently, at most one transaction can get the lock while other transactions will form a waiting queue.

In some example embodiments, a write statement will check the uniqueness of the primary key and act based on the write type. For example, an insert statement will fail if there exists a duplicate key. In some example embodiments, a transaction statement will try to acquire as many locks as possible in the first pass and check the conflict next. If there is any conflict, the statement will wait for conflict transactions to finish so that it can restart. A transaction may be aborted in order to break deadlocks. When a transaction aborts, it releases all previously acquired locks. The aborted transaction will be returned to the user with an error code.

The section below titled: KV Secondary Indices, describes example data layout for index tables. In some example embodiments, the transaction manager 440 implements a unified data layout, which will use the index fields+the primary key columns as the key for both unique and non-unique indexes. In some example embodiments, e.g., in the non-unified approach, the examples and the proposed steps will still hold but the implementation of the constraint check under the transaction manager 440 changes and is implemented as discussed below.

DML Query Execution and RSOs: When users want to insert, delete or update a KV table with secondary indices, the hybrid system 230 modifies the index tables together with the base primary table. Meanwhile, the hybrid system 230 checks the constraints during the modification if the index is unique. The hybrid system 230 introduced new RSOs (KvInsert, KvUpdate, KvDelete) in order to support DMLs for KV tables. To support secondary indices, the RSOs are extended so that the SI table could also be modified. The hybrid system 230 implements two options to change the RSOs and their pros/cons per below: (1) Reuse the existing RSOs and add the SI table modification within current RSO implementation. In an example, the hybrid system 230 does not need to rewrite or update the query plan. The hybrid system 230 optimizes the transaction manager 440 at the API level since the base and index table operator are tied together. (2) Create new RSOs for secondary indices table operations. It could be more performant for the bulk operation since the keys for each secondary indices could be ordered and benefit from FDB batch operation optimization.

Primary and Secondary Index Consistency: The consistency between the primary base table (e.g., base KV table) and the SI tables are enforced. If there is a statement writing to modify a row, the modification on base table and SI table will be executed in the same statement by the transaction manager 440. The same read timestamp is utilized to obtain a consistent read view. Since the modifications on the SI tables are in the same statement with the base table modification, they are either finalized or aborted together. By doing this, the hybrid system 230 can achieve the consistency between the primary and secondary index. In the following discussion, example cases that the hybrid system 230 supports and the steps to be performed under each case are described. In some embodiments, the hybrid system 230 can use the following table schemas as examples.

| Table Schemas |
| --- |
| CREATE KEY VALUE TABLE users ( id int PRIMARY, name string, email string UNIQUE, INDEX idx_on_name (name) ); CREATE KEY VALUE TABLE orders ( id int PRIMARY, order_number int NOT NULL, user_id int, FOREIGN KEY (user_id) REFERENCES users (id) ); |

Uniqueness Constraint: The uniqueness constraints are enforced for unique SI. The hybrid system 230 supports the immediate constraint check e.g., if the unique constraint is broken after a write, the hybrid system 230 will fail immediately. The hybrid system 230 can enforce the unique constraint by relying on the transaction manager 440 uniqueness check for the insert and update operations. It is possible that the SI constraint check may fail while the base table's constraint checks succeeded. In this case, the statement will fail and the modification on the base table will be rolled back and purged eventually. In some example embodiments, for multiple statements transactions, each statement will be executed separately. The hybrid system 230 executes the statement in a multi-statement transaction the same way as the single statement transaction since the constraint is validated immediately for each statement.

Multiple inserts in a transaction for the unique index: Suppose a user tries to insert two rows in a transaction. For the second insert statement, since it will insert a duplicate value for the email, it will break the uniqueness constraint. Example underlying steps include: (1.) Insert into the base table with The transaction manager 440 insert( ) API. (1a) Insert the serialized pair <2, abc@XYZ123.net|User_1>. (1b.) Check if the key exists. No duplicate key for id=2, continue. (2) Insert into the index table with The transaction manager 440 insert( ) API (2a.) with serialized pair <abc@XYZ123.net|2, null>. (2b) Check if the key exists. Found duplicate key for email=abc@XYZ123.net written by current transaction, throws an exception saying the uniqueness constraint breaks for the index on email. (3) Abort the current statement.

Conflicts Resolving and Deadlock Detection

The KV table relies on transaction manager 440 to resolve the conflicts and detect deadlock. It is possible that there are conflicts for the unique SI table even if there is no conflict for the base table. In an example, the conflict check is different from the uniqueness constraint enforcement. The uniqueness constraint check aims to make sure that there is no duplicate key written before the current statement for PK and unique SI while the conflict check aims to resolve the Write-Write conflicts from concurrent transactions.

For the unique index, it is possible that two transactions are trying to insert the same column value(s). The conflict resolution honors the writes on the index tables as the hybrid system 230. If the hybrid system 230 put the write on the index tables together with the base table in the same statement, the hybrid system 230 could reuse the existing conflicts resolving semantics where the write on index table will call the write APIs of transaction manager 440. In an example, the hybrid system 230 confirms that the writes and conflict resolving on the index tables follow the same order so that there is no unexpected deadlock.

The hybrid system 230 will rely on the index id to decide the execution order since the index id is immutable and consistent in all the XP instances via SDL. Also, the base table for the primary key will always happen at first before the writes on the other indexes and the index table write will follow the same order based on the index id. By doing this, the hybrid system 230 executes the writes on the base and the index tables sequentially via multiple writes APIs of transaction manager 440. After each write, the hybrid system 230 checks if there is any conflict. The hybrid system 230 will restart the current write if the conflict is encountered and continue the write on the next index if no conflict.

Concurrent inserts in multiple transactions: Suppose there are two statements S1 and S2 in two auto-commit transactions. Both are trying to insert into one row in the users table with the same email address. This will introduce the conflicts on the unique index table on the email column. Example Steps: (1.) S1 insert into the base table with serialized pair <1, abc@XYZ123.net|User_2>. (1a.) S1 found no uniqueness break and conflicts, continue. (2.) S2 insert into the base table with serialized pair <2, abc@XYZ123.net|User_3>. (2a.) S2 found no uniqueness break and conflicts, continue. (3.) S1 insert into the unique index table on email, <abc@XYZ123.net|1, null>. (3a.) S1 found no uniqueness break and conflicts, continue. (4.) S2 insert into the unique index table on email, <abc@XYZ123.net|2, null>. (4a.) S2 found no uniqueness break but will see the conflicts. (5.) S2 will restart and wait for the conflicting transaction (Ti) to finish. (6.) S1 insert into the secondary index table on name, <User_2|1, null>. (6a.) S1 find no uniqueness break and conflicts, continue. (7.) S1 finalizes and the transaction commits. (8.) S2 restarted and the statement now will have a new read timestamp. (9.) S2 insert into the base table with pair <2, abc@XYZ123.net|User_3>. (9a.) S2 continues as no uniqueness breaks have occurred, and nor have conflicts. (10.) S2 insert into the unique index table on email with pair <abc@XYZ123.net|2, null>. (10a.) S2 will find a duplicate key, and the uniqueness constraint breaks. An exception is thrown. (11.) S2 will be aborted.

Foreign Key Constraints Enforcement: Users can create a table (child table) with an FK (foreign key) referencing the primary or unique key of another table (parent table). Still using the above table schemas as examples, the orders table is a child table that contains an FK referencing the PK of the parent table users.

There are two cases that are considered for the FK constraint that are discussed in further detail below.

FK Check

When a user issues an insert into the child table, or an update with the child table which updates the referential columns, the hybrid system 230 issues an FK check and make sure that the new values of the referred columns exist in the parent table. In an example, the FK check result should be consistent until the write is finalized. For example, the record in the parent table which is referring to by the row inserted into the child table could not be deleted between the key insertion and the statement finishes in the child table. In order to support this semantics, the hybrid system 230 checks if there is any concurrent deletion of the referring key. The hybrid system 230 could issue a read on the parent table to see if there is any ongoing concurrent deletion of the referring key. If there is any, it means that there is another transaction that tries to delete the key. The hybrid system 230 treats these two transactions as they "conflict" on the FK constraint. And the hybrid system 230 will restart the statement and do the writing and check again.

Given the following example in the "Insert into the child table w/valid FK constraint" example, the detailed steps proposed for the two approaches are listed as below.

In the following examples, the orders table is a child table which contains a FK referencing the PK of the parent table users.

Figure 8A:
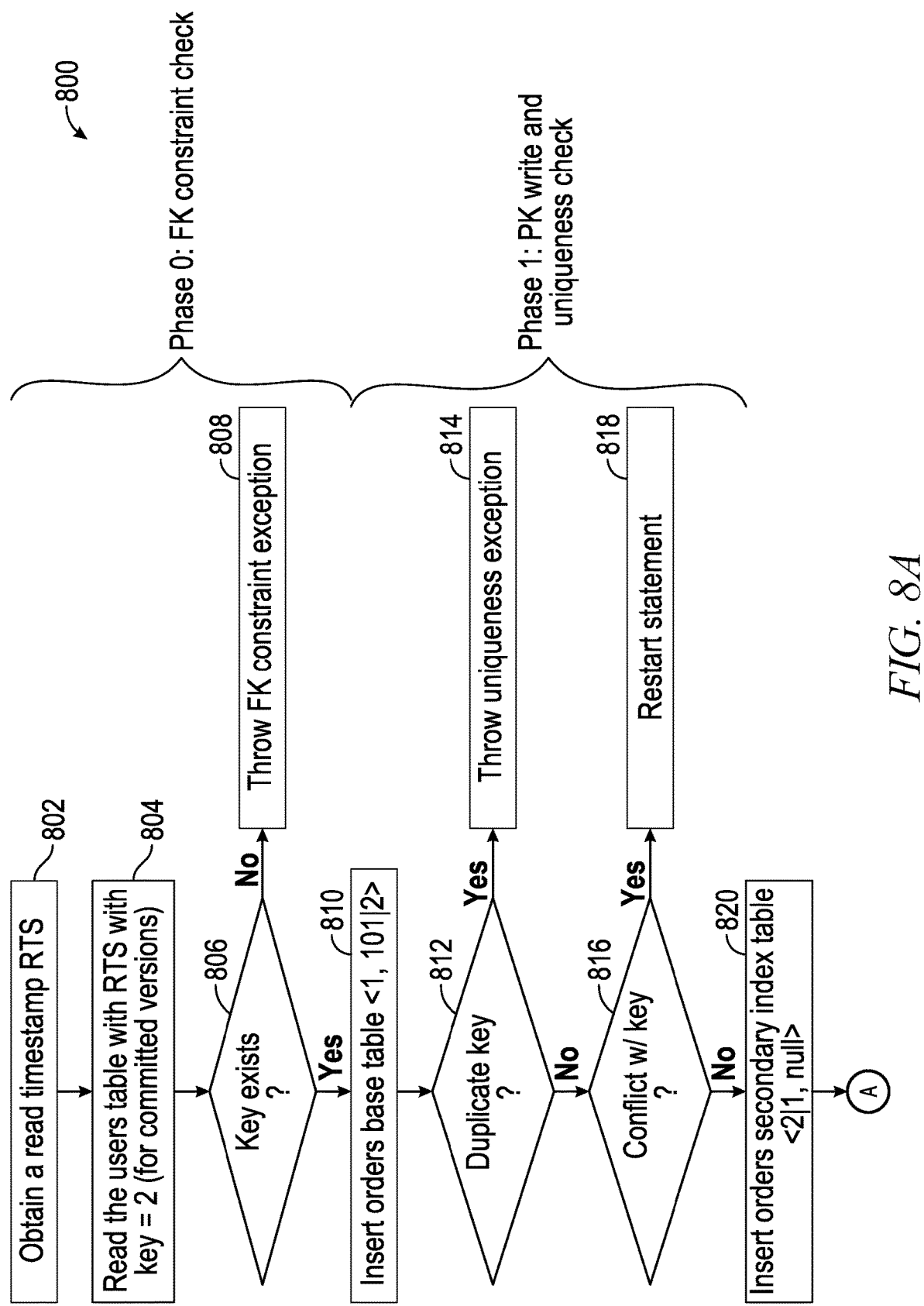
FIG. 8A and FIG. 8B show examples of a hybrid database flow diagram, in accordance with some embodiments of the present disclosure.
Figure 8B:
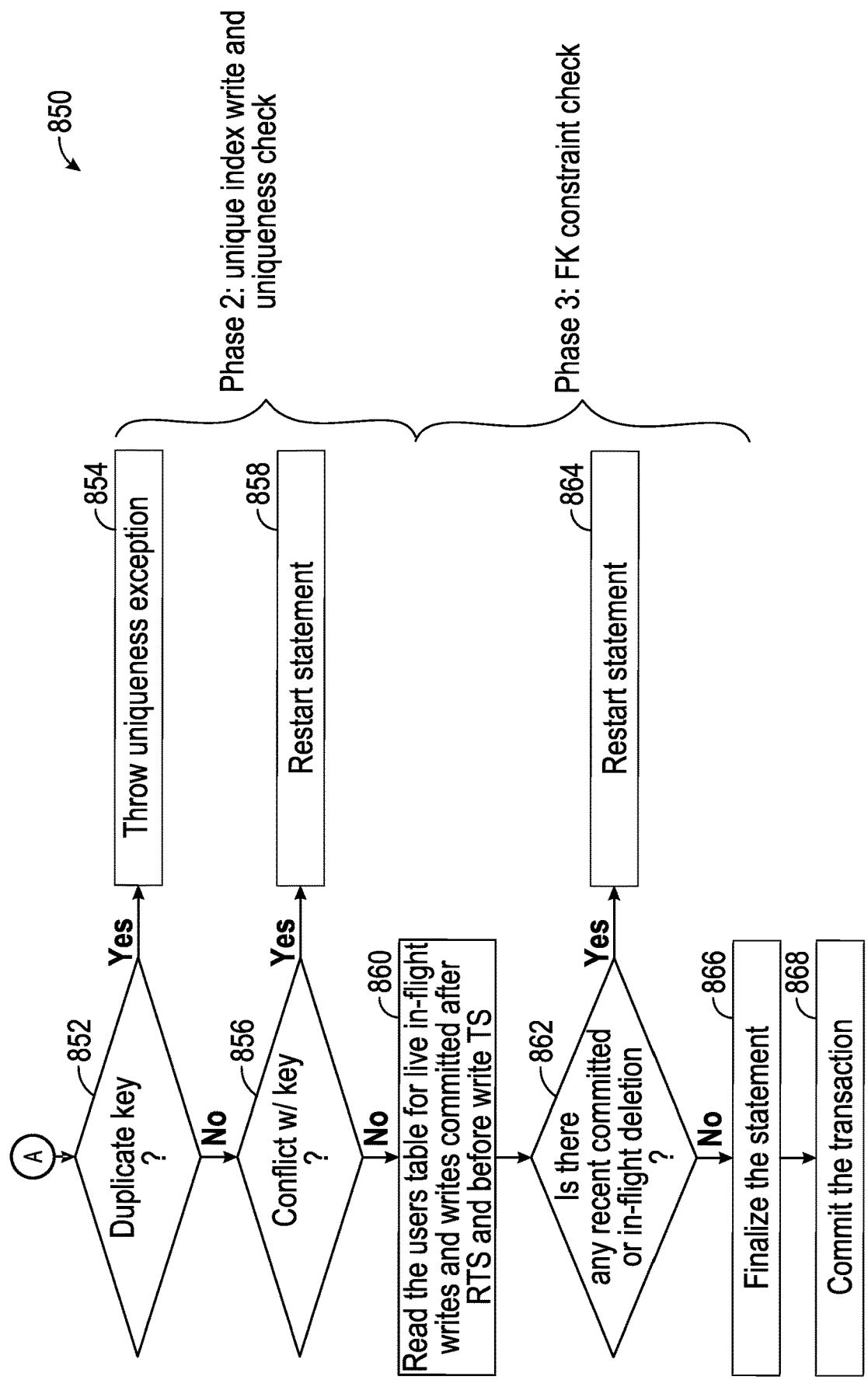

FIG. 8A and FIG. 8B shows flow diagrams illustrating operations of an insert operation into the child table with a valid FK constraint, in accordance with some example embodiments.

Example code for the example is shown in the following:

S0: INSERT INTO users VALUES (1, "abc@XYZ123.net", "User_2"), (2, "xyz@databasePlatform.com", "User_3");
S1: INSERT INTO orders VALUES (1, 101, 2);

FIG. 8A and FIG. 8B show the proposed steps for the 2nd option to do extra existence checks on the uncommitted conflicting change, in accordance with some example embodiments.

As shown, FIG. 8A and FIG. 8B are example flow diagrams illustrating operations of the hybrid system 230, including transaction manager 440 where appropriate, performing a method 800 and a method 850, in accordance with some embodiments of the present disclosure. The method 800 and method 850 may be embodied in computer-readable instructions for execution by one or more hardware components (e.g., one or more processors) such that the operations of the method 800 and method 850 may be performed by components of network-based database system 102 or execution platform 110. Accordingly, the method 800 and method 850 are described below, by way of example with reference thereto. However, it shall be appreciated that the method 800 and method 850 may be deployed on various other hardware configurations and is not intended to be limited to deployment within the network-based database system 102.

The example in FIG. 8A illustrates phase 0 for FK constraint check and phase 1 for PK write and uniqueness check.

As mentioned before, example code corresponding to query statements for the examples of FIG. 8A and FIG. 8B is provided by the following:

```
S0: INSERT INTO users VALUES (1, "abc@XYZ123.net", "User_2"),
    (2, "xyz@databasePlatform.com", "User_3");
S1: INSERT INTO orders VALUES (1, 101, 2);
```

In view of the above, two statements (S0 and S1) corresponding to respective insert operations into two different tables are provided. The examples in FIG. 8A and FIG. 8B are related to statement S1 above.

At operation 802, hybrid system 230 obtains a read timestamp (RTS).

At operation 804, hybrid system 230 reads a users table with the read timestamp with a key of a particular value (e.g., key=2 for committed versions).

At operation 806, hybrid system 230 determines whether the key exists. When a user issues an insert into the child table, or an update with the child table which updates the referential columns, the hybrid system 230 issues an FK check and determines whether the new values of the referred columns exist in the parent table.

At operation 808, when the key does not exist (e.g., from operation 806), hybrid system 230 throws a foreign key constraint exception, and method 800 ends.

At operation 810, when the key exists, hybrid system 230 performs an insert operation on an orders base table (from statement S1 above where values of 1, 101, 2 are inserted into the order table).

At operation 812, hybrid system 230 determines whether a duplicate key exists for a primary key.

At operation 814, when there is a duplicate key for the primary key (e.g., from operation 812), hybrid system 230 throws a uniqueness exception, and method 800 ends.

At operation 816, when there is no duplicate key, hybrid system 230 determines whether there is a conflict with the primary key. In an example, hybrid system 230, using transaction manager 440, scans the pairs prefixing with the key and checks if there is any committed transaction or any in-flight writes in the range between the begin and end timestamp.

At operation 818, when there is a conflict with the primary key, hybrid system 230 restarts the statement, and method 800 ends.

At operation 820, when there is no conflict with the primary key, hybrid system 230 performs an insert operation on an orders secondary index table (e.g., <2|1, null>).

The example in FIG. 8B illustrates phase 2 for a unique index write and uniqueness check, and phase 3 for a FK constraint check. FIG. 8B is a continuation of the discussion in FIG. 8A from operation 820 where hybrid system 230 performs an insert operation on an orders secondary index table.

At operation 852, hybrid system 230 determines whether a duplicate key exists for the insert operation on the orders secondary index table.

At operation 854, hybrid system 230 throws a uniqueness exception when the duplicate key is determined and the method 850 ends.

At operation 856, where there is no duplicate key, hybrid system 230 determines whether there is a conflict with the key. In an example, hybrid system 230, using transaction manager 440, scans the pairs prefixing with the key and checks if there is any committed transaction or any in-flight writes in the range between the begin and end timestamp.

At operation 858, hybrid system 230 restarts the statement when there is a conflict with the key.

At operation 860, hybrid system 230 reads the users table for live in-flight writes and writes committed after the read timestamp and before the write timestamp.

At operation 862, hybrid system 230 determines whether there is any recent committed or in-flight deletion.

At operation 864, hybrid system 230 restarts the statement when there is a recent committed or in-flight deletion, and method 850 ends.

At operation 866, hybrid system 230 finalizes the statement.

At operation 868, hybrid system 230 commits the transaction (e.g., both previous insert statements from operation 810 and operation 820).

In order to support the aforementioned methods to do the conflict checking, the hybrid system 230 provides a custom API to satisfy the implementations discussed here. The proposed custom API for the transaction manager 440 is described below:

Example Custom API:

```
semi_future<Unit> regConflict(const KeyRange& keyRange, const
WriteType conflictWriteType, const Timestamp& writeTs);
```

When the hybrid system 230 calls this API, the transaction manager 440 will scan the pairs prefixing with the key and check if there is any committed transaction or any in-flight writes in the range between the begin and end timestamp. The following describes various scenarios that involve the API.

Two use scenarios: This function will be used at both the child table and parent table write. When the hybrid system 230 inserts a child table row, the hybrid system 230 verifies that the referring parent table row exists or that no in-flight deletion via the referring parent table PK or secondary index; when the hybrid system 230 deletes a parent table row, the hybrid system 230 verifies that the referred child table row does not exist or no pending insertion, using the child table's index on the FK.

Different index data layout: If the hybrid system 230 goes with the unified index data layout, all the index keys will contain the index fields and the primary key columns. When doing the conflict check, the hybrid system 230 could use the index fields' serialized value as the prefix key. If the hybrid system 230 goes with the non-unified index data layout, the unique index will only contain the unique index fields. The hybrid system 230 could still use the serialized index fields value, which is in concept not the key prefix, but essentially the transaction manager 440 API will handle that since The transaction manager 440 will issue the range scan internally anyway.

Bulk writes: Although the bulk workload is not a goal of this design, the customer could modify multiple rows in a single statement. If the customer issued a write with multiple rows, e.g., inserting a bunch of rows into the child table, the hybrid system 230 handles this case too. In this case, the hybrid system 230 could populate a list of the keys and pass it as a KeyList parameter (e.g., including the list of keys). In an example, since the bulk write keys could have different write timestamps, the hybrid system 230 will use the largest write timestamp as the end timestamp.

Transient conflict: If the hybrid system 230 wants to check if there is any pending insertion, it is possible that the other statement did an insert and then deleted it. In an example, the hybrid system 230 does not treat the transient change as the real conflict since it is consistent with the MySQL/Postgres behavior.

FK Actions: When an update or delete operation affects the parent table that has matching rows in the child table, the rows in the child table are updated or deleted accordingly. The hybrid system 230 calls the modifications in the child table as FK actions, which specifies the action performed when the PK or unique key for the foreign key is updated or deleted. Based on the ANSI SQL standard and the documents of the network-based database system 102, the hybrid system 230 supports the following types of FK Actions: RESTRICT, NO ACTION, SET DEFAULT, SET NULL, CASCADE. The hybrid system 230 describes the execution order of the FK Actions using the DELETE RESTRICT operation as an example, the other action types are listed in the appendix section and the UPDATE operation execution is similar to the DELETE.

The following discussion relates to deleting a row from a parent table along with a restrict action type.

Delete a Row from Parent Table w/RESTRICT Action Type

A set of example query statements is as follows:

```
CREATE KEY VALUE TABLE users (
id int PRIMARY,
  name string,
  email string
  UNIQUE, INDEX
  idx_on_name
  (name)
);
CREATE KEY VALUE TABLE orders (
  id int PRIMARY,
  order_number int
  NOT NULL,
  user_id int,
  FOREIGN KEY (user_id) REFERENCES users (id) ON DELETE
  RESTRICT
);
INSERT INTO users VALUES (1, "abc@gmail.com", "Dimitris"), (2,
"xyz@snowflake.com", "Khaled");
INSERT INTO orders VALUES (1, 101, 1);
S1: DELETE FROM users WHERE id = 1;
```

Suppose there is a row in the users table with id=1 and a row in the orders table referring to it with user_id=1. There is a delete operation that tries to delete the row in the parent table. The execution steps are listed below:
1. Issue a delete operation by inserting into the users base table with a tombstone
   a. Check the key existence and no conflicts found, continue
2. Issue a delete operation by inserting into the users index table on email with a tombstone
   a. check key existence and conflicts, continue
3. Issue a delete operation by inserting into the users index table on name with a tombstone
   a. check key existence and conflicts, continue
4. Issue an exist( ) operation on the orders table's implicit secondary index on user_id, using user_id=1.
   a. The exist( ) call returned true since the pair exists for <1|1, null>
5. Throws an exception mentioning the FK constraint check failed
6. Abort the statement FK Constraint Semantics If an FK constraint check is valid for a statement, the FK constraint check needs to be valid at the read timestamp and uphold until the commit timestamp. Which means that the FK constraint needs to be consistent among the statement lifetime to avoid experiencing unexpected behavior. For example, if a statement tries to insert an FK reading the non-existence of the PK, it is supposed to fail but if another transaction inserted the row with the PK before the commit, it could succeed if the constraint check is not enforced until the commit timestamp.

In the above FK Check and FK Actions, there are two operations that involve the existence check during DML.
   When inserting into a child table (or update generate a new FK values in a child table), it is determined that the new parent table contains the corresponding row.
   When deleting a row from the parent table (or update generating PK values in the parent table), it is determined that no rows in child table referencing, if FK Action is RESTRICT or NO ACTION.

It is important to ensure that the constraint check is consistent and valid over the statement execution. This could be achieved via the conflict check with the read timestamp and the write timestamp on the referencing or referenced table. If there is no conflict, it means that there are no changes that are committed or in-flight during the statement that could impact the constraint check.

KV Secondary Indices:

KV Tables: Every Key-Value (KV) table has a primary key (PK), which is defined as a subset of its columns. A PK is essential to formulate the key used to store each KV record in the FDB-backed Data Store. In turn, all KV records are stored in the ordering dictated by the PK. A KV table's Secondary Index (SI) is an access structure stored in the FDB-backed data store, which aids in performing lookups on non-PK columns, and constraint enforcement efficiently. Since SIs will be used in the same FDB-backed data store, their records are formulated as key-value pairs. The data layout for KV tables includes a prefix, followed by the actual data, which includes a key and a value. The key for each KV record is a concatenation of the prefix and the key for a particular record.

In an implementation, an SI of a KV table can be summarized as:
   A permanent KV table, whose records are stored in the FDB-backed data store (e.g., provided by storage platform 104).
   Dependent on the base KV table.
   "Invisible" as it cannot be queried by itself (e.g., perform a SELECT query on it); rather, it can be scanned as part of a more elaborate query.

An SI's information should be efficiently stored in the metadata. On top of this, an SI should inherit the same access rights as the base table (including RBAC (role-based access control) policies).

In this following discussion, an SI's fields are discussed and a hybrid Java/SQL notation is utilized for describing data types.

In an implementation, the following "metadata" information is stored for a SI:
1. Unique Id for the SI.
2. Name: The name of the SI
3. Base Table: The base table the SI is defined on.
4. Unique: a flag indicating whether the SI is unique or not.
5. (Collection<IndexColumn>) IndexColumns: This is a collection of the SI's columns formulating its key. Each IndexColumn object can be represented by the same TableColumn object of the base-table, or just the id of the TableColumn object (i.e., the corresponding BaseDictionaryDPO unique id).

Data Layout

As mentioned above, the data layout for KV tables includes a prefix, followed by the actual data, which includes a key and a value. The key for each KV record is a concatenation of the prefix and the key for a particular record. In an implementation, the data layout includes the following:

A. SI-Prefix: the prefix used for all records of a SI.
    B. SI-Key-Layout: the suffix appended to the key of each SI record.

The following discussion relates to the SI-Prefix mentioned above.

Each SI is represented as a nested table in metadata. As a result, each SI carries (i) a global unique identifier (BaseDictionaryEntity.id), (ii) a parent table (Table.NestingContainerId), and (iii) a list of columns that include the key of each SI record.

As discussed below, in order to accommodate a SI, two implementations of a data layout are provided for the SI-Prefix. Both of them require a local index id, which will be used to uniquely identify each SI in the context of its parent table.

The following discussion relates to an Index-ID that represents a sequential identifier for each SI.

Each SI is identified by a sequence number, named Index-ID, which is unique in the context of a KV table. For the Index-ID, the following can be utilized 1) the local table ID extracted from the SI's Table.id, (4 bytes); or, 2) a shortened Index-ID for each SI can be introduced. This shortened Index-ID can be tracked by an increasing counter for each KV table. This involves additional metadata on the TableDPO which will be a single counter named indexCounter. This indexCounter will have a different utility on the base and each SI:

Base Table: Indicate the number of SIs that have been historically defined for this table. The PK index, which is the base table itself, is not included in this count.
    SI: Indicates the ID of the SI Every time a new SI is added, the indexCounter is incremented, and the new value is used as an identifier for the new SI.

Figure 9:
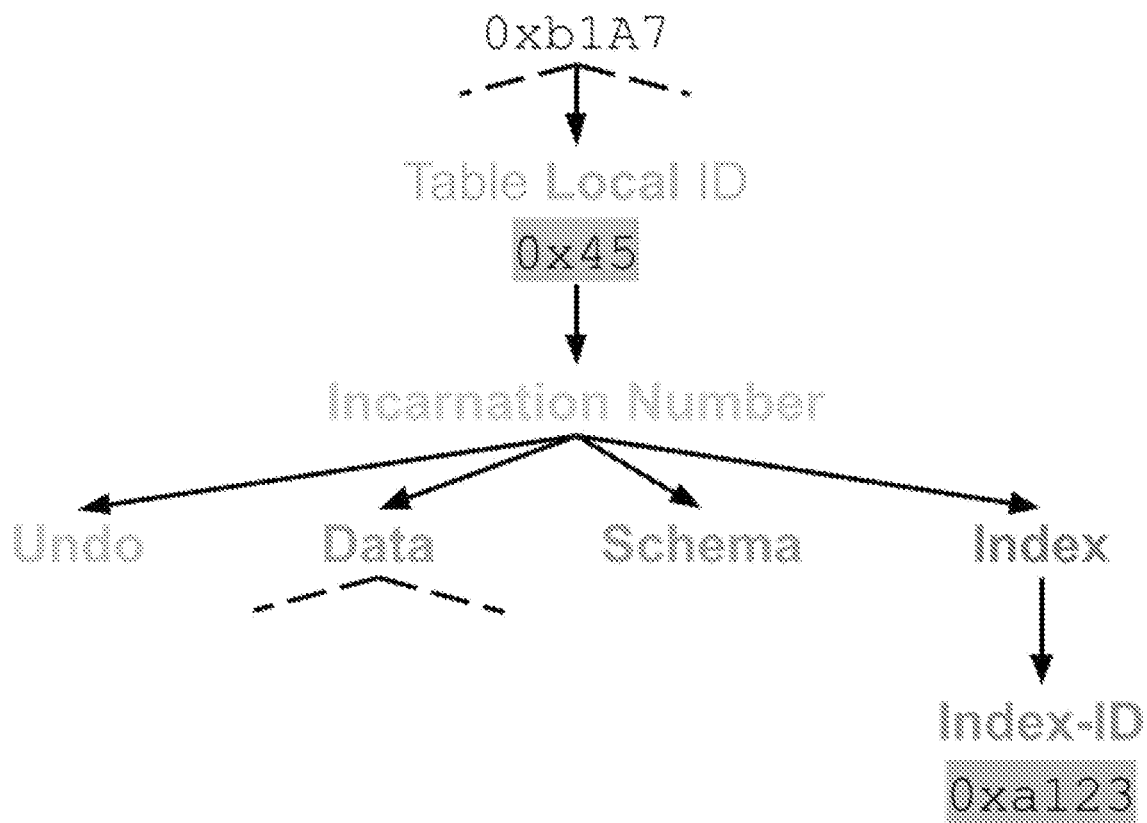
FIG. 9 illustrates an SI prefix data layout including a new index category in accordance with some embodiments of the subject technology.

FIG. 9 illustrates an SI prefix data layout including a new index category in accordance with some embodiments of the subject technology.

As illustrated, data layout 900 represents a database directory byte-encoded prefix.

This approach adds an additional data type under the Incarnation Number. In an implementation, Key-value Data Layout data types include the following:

Undo: type code 1
    Data: type code 2
    Schema: type code 3 where each type code above is a different (unique) type code

A new category, named Index, is added. Under this code, each SI will be stored using its table-local Index-ID code. Overall, this approach introduces an additional byte payload equal to the byte size of Index-ID.

In an embodiment, UNDO support is provided for SIs. To this end, the Undo path includes a flag to differentiate the UNDO data for the base table and for each SI. This leads to the following approaches.

New Index-Undo Under Incarnation Number

This entails that in the prefix under the incarnation number there will be an additional category, namely Index-Undo, under which all Index undo data are stored (including the IndexID).

Differentiate Undo Data Based on the Data Type

This entails that under Undo, the following flags are added:

UNDO_DATA: undo space for data
    UNDO_INDEX: undo space for Secondary Indexes.

Each one of those flags can be a single byte to differentiate the different types of undo data.

SI-Key-Layout

This section discusses the storage format for the suffix used in the keys of SI records. The following notations are mentioned further below:

SIPrefix: This is the SI-Prefix used for each SI.
    SIColX: This is a base table's column value that is used in position X for a SI's key. For instance, if SI foo is defined over columns (a, b), Then SICol1 is a, SICol2 is b, and the key for foo's records is the concatenation of SICol1 SICol2.
    KVPrimaryKeyValue: This is the value(s) that includes the primary key for a base table's record.

The KVPrimaryKeyValue inherits the same conventions and limitations from the base KV table (i.e., it can not include non-scalar columns2). In addition, it will be serialized in the same way as it is serialized for identifying the base table's records. Below, two implementations for the layout of SI records are discussed (e.g., unified layout, and non-unified layout).

Unified Layout for SIs

By adopting a uniform layout design, the Unique and Non-Unique layouts can be combined to always include the KVPrimaryKeyValue in the key suffix, and maintain an empty value. The lookup logic for unique SIs can operate differently for different SI types (e.g., before updating a unique SI's record, lookup if a record without the KVPrimaryKeyValue suffix exists). In essence, the layout will be the following for all types of SIs:

| Key | Value |
| --- | --- |
| SIPrefix/SICol0SICol1.../KVPrimaryKeyValue | null |

In this case, the logic for retrieving records from unique and non-unique indexes differs:

Unique: the lookup is performed using just the SI columns. If a record is found when a DML is submitted, then a conflict should be thrown to indicate that a record with the same column value(s) already exists.
    Non-Unique: the lookup will only search for the values of the SI columns (i.e., SICol0SICol1 . . . ). If records are found, no conflict is thrown as it is a non-unique SI.

With the unified layout, a validation phase is essential at the end of a DML Statement/Transaction. This validation can be implemented by offer either of the following APIs:

1. Serve concurrent non-committed updates/inserts on a specific range.
    2. Register read ranges in a Transaction's/Statement's conflict map.

For example, if two transactions are trying to insert the same unique value (email) concurrently:

T1: INSERT INTO user VALUES (1, "abc@gmail.com", "Dimitris");
    T2: INSERT INTO user VALUES (2, "abc@gmail.com", "Nikos");

Then, to protect from constraint violation, T1 (or T2) should do the following:

1. Insert a record in the base table: <1, abc@gmail.com|Dimitris>.

a. stmtCtx.insert([userTablePrefix|1], [abc@gmail.com|Dimitris])
2. Insert a record in the unique index using the uniform layout: <abc@gmail.com|1, null>.
   a. stmtCtx.insertauniqueEmailIndexPrefix|abc@gmail.com|1, [ ])
3. Validate using either one of the following schemes:
   a. Read for any committed or uncommitted records in the unique index with key prefix "abc@gmail.com". If any record is found, then restart.
      i. stmtCtx.readRange([uniqueEmailIndexPrefix|abc@gmail.com|0], [uniqueEmailIndexPrefix|abc@gmail.com|Inf])
   b. Record the range (abc@gmain.com|0, abc@gmail.com|Inf) in the conflict-map for the given transaction. This way, if another transaction tries to write in this range, transaction manager 440 will detect a conflict and only one transaction will be allowed to commit.
      i. stmtCtx.registerConflictRange(abc@gmain.com|abc@gmail.com|Inf, long timestamp)
4. Commit.

Non-Unified Layout for SIs

This implementation follows a different key layout depending on the type of an index.

For unique SIs, the key will be the combination of column values that constitute the key, and the value will be the primary key for the base table.

| Key | Value |
| --- | --- |
| SIPrefix/SICol0SICol1.../KVPrimaryKeyValue | null |

Figure 10:
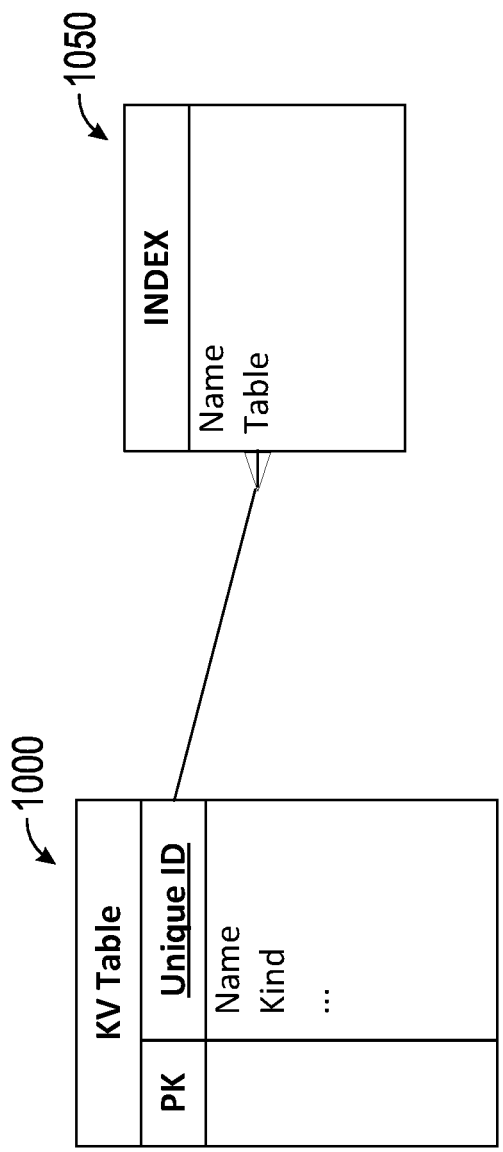
FIG. 10 illustrates a relationship between a secondary index and its key value (KV) base table in accordance with embodiments of the subject technology.

FIG. 10 illustrates a relationship between a secondary index and its key value (KV) base table in accordance with embodiments of the subject technology.

As shown, a relationship between an SI 1050 and its KV base table 1000 is N:1. In an implementation, at SI definition, the following checks need to be successful:
1. Existence of a base table.
2. The base table is a hybrid table.
3. Existence of the base table in the same schema, database, and KV backend datastore.
4. The referenced columns of the base table exist.
5. The referenced columns are of scalar data types.
6. No Existence of an SI with the same name for the base table.
7. No Existence of an SI on the Base Table with the same order of columns.

In an example, a set of actions that are performed include the following:
1. If a SI is unique, or a column of a KV table is defined as Unique, then a uniqueness constraint needs to be registered in the metadata.
2. If a PK-FK relationship is defined, a non-unique SI needs to be registered to the base table (i.e., referencing) along with a FK constraint.
3. At DML, the enforcement of unique constraints needs to be validated.
4. At DML, the enforcement of referential integrity constraints need to be checked.
5. For SELECT and DMLs, if SIs exist, then they should be used by the compiler.

SI Metadata Layout

In an example, SI-related metadata will be accessed at query compilation, planning, and optimization phases of a query. During those phases, the following lookups can occur:
I. Find all the SIs for a given KV table.
II. Find the information for a given SI id/name.
III. Find all the SIs for a given account.
IV. Find all the SIs for a given database/schema.

In an example, as discussed before, an SI should is defined as a permanent KV table itself, as its storage will be the FDB-backed datastore. To this end, the existing KV secondary slice for KV tables can also be used. As discussed below, various approaches to accommodate SI's metadata in the subject system are provided.

SI View Object with Nested-Objects Framework

In an example, a first approach to reflect the nested relationship of SIs with their base tables is to use the newly-introduced framework for Nested-Objects. This framework is introduced to address the common pattern of codifying dependencies among metadata entities. In essence, the base table is the "Containing Object", and each SI becomes a "Nested Object". SIs are "system-managed" and are only query-able by the system (i.e., a user cannot perform scans on them). Some benefits of using the nested-object framework include the following:
  The SI automatically inherits the RBAC (role-based access control) of the base table.
  SIs' metadata footprint is connected to the base table.
  Allow the 1-to-N relationship among base tables and indices.
  The SI is constrained to the same-account as the base table (along with the same database and schema).
  Metadata management can be cleaner as it reduces the probability of dangling SI metadata.

In an example, in a second approach, akin to a Materialized View (MV), an SI can be represented in GS as a subclass of the Table object. However, the metadata backend is still stored as a TableDPO (e.g., table data persistence object). Functionality for KV table indices can be moved as part of a new class (e.g., named KvSecondaryIndex). If predicates and complicated expressions need to be supported for SIs, then the Table objects definition field can be used to accommodate columns, predicates, and the unique flag defined in secondary index fields. In an implementation, the unique flag can be stored as a constraint on the table.

In an example, to expedite retrieval of SI metadata and to avoid exceeding a time limit for an FDB transaction, an SI-specific secondary slice is needed. This new slice will be similar to the KV-table Secondary Slice used by the transaction manager 440 compactor. This SI-specific secondary slice will only include basic information for active SIs of a specific account. In detail, the secondary slice keys can be the following:
1. Base Table ID
2. Unique Flag
3. Index Name (or SI identifier)

In an example, this secondary slice can expedite the lookups needed for retrieving all indices for (i) a specific account, and (ii) a specific base table (i.e., lookups outlined in the Supported Statements section). In addition, this new secondary slice will expedite the operations enumerated in the beginning of this section. In an example, additional fields can be added in the key of the secondary slice.

In an implementation, features from the first approach and the second approach are combined. In detail, a SI will be stored as a TableDPO with its parent being the containing schema (same as a regular table) (i.e., TableDPO.parentId is the schema id). In addition, a SI will not be considered a KV table itself (i.e., TableDPO.isKeyValue( )==false), to avoid interfering with existing KV table operations. The SI will inherit all KV-backend information from its base table (e.g., datastore-ID, KV-database, etc.), which will be retrieved from the base table (as it is a common pattern to first retrieve the base table metadata prior to the SI metadata). Also, the SI will carry an TableDPO.IndexType, an TableDPO.indexSourceTableId, and its own column definitions. On top of this, the connection with the base table will take place with the nesting framework (this will allow us to not introduce a new secondary slice).

In addition to the above, each index will carry the following two fields:
1. kvIndexCounter: This field is used to generate unique index identifiers in the context of a KV table.
2. kvIndexStatus: An enum field that would indicate whether DMLs should be propagated to a SI and whether the SI should be used for querying the base table and constraint enforcement.

In an implementation, a table is the main entity in a database. Each table belongs to a schema, which in turn belongs to a database. When interacting with FDB for table operations, all interactions take place using the TableDPO representation. In an example, fields of a TableDPO include the following:
  accountId: the account that the table belongs to.
  Id: a unique identifier for the table.
  parentId: the unique identifier of the parent entity. This is the schema unique identifier.
  name: The name of the table.
  kindId: The kind of a table. For Secondary Indices the value KEY_VALUE_INDEX can be used.
  mvTypeId: The type of a materialized view in case the table is a materialized view.
  mvSourceTableId: The id of the source table id if the table is a materialized view.

Metadata Changes for Indices

In an implementation, a secondary index is accommodated as a table in existing metadata. An index's structural information is accommodated in a TableDPO, and constraints in multiple ConstraintDPO objects.

Constraints are represented in metadata using the ConstraintDPO object. In an example, ConstraintDPO fields include the following:
  deferrable: this enumeration defines the deferability of a constraint
    InitiallyDeferred
    InitiallyImmediate
    NotDeferrable
  definition: a literal representation of the constraints definition
  id: the unique identifier of a constraint.
  kindId: This can be any of the following values:
    NOT_NULL
    PRIMARY_KEY
    UNIQUE
    DEFAULT
    CHECK
    MISSING
    FOREIGN_KEY
  name: the name of the constraint.
  parentId: is the unique identifier of the base table (i.e., TableDPO.id).
  tableColumnId: The base table's column in which the constraint is defined on.
  updateAction: This is the action taken for the constraint on update. This can take any of the following values: CASCADE, SET_NULL, SET_DEFAULT, RESTRICT, NO_ACTION
  deleteAction: This is the action taken for the constraint on delete In an implementation, a PK constraint is created for each KV table. If an SI is associated with a uniqueness constraint on a subset of columns, then a UNIQUE Constraint entry should be maintained in the Metadata. If an FK constraint is defined, then it should be reflected in the metadata as a FOREIGN_KEY constraint between the referenced and the referred tables. At the moment, KV tables store their PK constraints using the existing ConstraintDPO infrastructure.

FIG. 11 shows example nested metadata 1150 implemented by the hybrid system 230, in accordance with some example embodiments. In the example of FIG. 11, the indexes are table-dependent invisible entities and are connected with the base table using a nested-object framework of the network-based database system 102, in accordance with some example embodiments. As an example, when a table is dropped, the indexes associated with the table are detached and marked as deleted. In some example embodiments, a metadata cleaner task in the hybrid system 230 is configured for purging the deleted metadata.

Secondary Indices Implementation

The main data layout for key-value tables today is the primary index stored natively in FDB. In order to improve the performance of DMLs and to support logical database constraints (e.g. UNIQUE), secondary indices are introduced for key-value tables. Compared to a primary index, which stores all the columns of a key-value table, a row of a secondary index does not contain by default all the columns of a table. At a minimum, it includes the values of the indexed columns as well as the values of the associated primary key columns. Other database systems (e.g. Postgres) will allow additional columns to be included in a secondary index (such indexes are often called "covering indexes), thus allowing certain queries to be answered directly through the secondary index without requiring any additional lookups to the primary index.

With the advent of hybrid tables, key-value tables, including their indices, are stored in two places: a) natively in FDB, b) in Hybrid storage backed by S3 (or any other cloud storage). All table changes are initially applied to FDB and then asynchronously replicated to Hybrid storage. Queries can retrieve rows from either of these representations with the exact same transactional semantics. The decision of where to retrieve data from is transparent to the user and is made by the planner (e.g., compute service manager 108 or component thereof) based on the properties of a statement.

In the following, a discussion is provided for query processing for key-value tables in the context of secondary indices. In particular, the following are discussed: new access paths introduced by secondary indexes, the changes in the planner (e.g., compute service manager 108 or component thereof) in order to decide the best access path for a SELECT statement as well as a new join algorithm (nested-loop join) that can be used instead of the default hash-based join implementation.

The following are phrases that are mentioned below:

| | |
|---|---|
| FDB Scan | Scanning the data of a hybrid table from an FDB cluster. That should include key range scans and key probes. |

-continued

| | |
|---|---|
| Blob Scan | Scanning the data files of a hybrid table using the blob workers. |
| Hybrid Storage | Storage system including a data FDB cluster and the blob workers. |
| Hybrid Table | Also known as key-value table and is the logical table type backed by Hybrid Storage |

Indices in SELECT Statements

A discussion of different access paths for key-value tables and how they can be executed against Hybrid Storage is provided in the following.

Full Table Scan is the access path used to fetch all the rows of a key-value table. This access path would be typically used when there are no predicates on any of the indexed columns or when an index-based access path is deemed too expensive, i.e. results in a large number of index probes. Full Table Scans are executed only against the blob storage. Since the format of the files stored in blob storage is not columnar, all the columns of a row are retrieved from the storage engine and are then projected by the scan operator in order to produce the output rowsets. Full Table Scan is driven by a set of key ranges (KvRangeScanset) that is assigned to the scan operator during compilation and extracted from the EP cache. Assigned predicates are applied on the produced rowsets. Below are examples of SELECT statements that will be executed using Full Table Scan:

SELECT * FROM FOO;
SELECT * FROM FOO WHERE NON_INDEXED_KEY_COL='VALUE';

Index Unique Probe is used when there is an equality predicate on a unique column(s) of a key-value table; that includes primary keys columns or columns with unique constraints. An Index Unique Probe is guaranteed to return a single row and is executed only against FDB. The planner (e.g., compute service manager 108 or component thereof) detects this case and separates the equality predicate on the unique column(s) from any other predicates assigned to the scan operator. The equality predicate is converted to a key range and is used to fetch rows from FDB. The remaining predicates are applied on the retrieved rows. Below are examples of SELECT statements that will be executed using Index Unique Scan:

SELECT * FROM FOO WHERE PRIMARY_KEY_COL='VALUE',
SELECT * FROM FOO WHERE UNIQUE_KEY_COL='VALUE';

Index Range Scan is used when only a subset of an index (primary or secondary) is scanned due to the existence of predicates on the indexed columns. Predicates assigned to the scan operator are split into two groups by the planner (e.g., compute service manager 108 or component thereof): a) predicates on indexed columns that are used for range pruning and cardinality estimation, and b) predicates that aren't used for range pruning; these predicates can still be used for read version pruning. Below are examples of SELECT statements that will be executed using Index Range Scan:

SELECT * FROM FOO WHERE PRIMARY_KEY_COL BETWEEN 'VALUE1' AND 'VALUE2';
SELECT * FROM FOO WHERE SECONDARY_KEY_COL='VALUE';
SELECT * FROM FOO WHERE SECONDARY_KEY_COL<'VALUE';

One of the implications of doing an Index Range Scan on a secondary index is that, for most cases, the secondary index cannot provide all the table columns that are referenced by a statement. To that end, the primary index needs to be accessed as well in order to extract columns that are not served by the secondary index.

There are at least three options available for executing an Index Range Scan using a secondary index depending on which storage engine used for scanning the secondary and primary index respectively.

Secondary Index Scan on FDB—Primary Index Probe on FDB (FF)

In this approach, both the secondary index scan and the primary index probes are executed in FDB. This option should be used when the cardinality of the scan is expected to be very low1 (e.g. <100 rows).

Secondary Index Scan on Blob—Primary Index Probe on FDB (BF)

In this approach, the secondary index scan is performed in blob storage whereas the primary index probes are performed on the primary index in FDB. This option makes sense when the secondary index scan is too expensive to run on FDB.

Secondary Index Scan on Blob—Primary Index Probe on Blob (BB)

In this option, both the secondary and the primary indexes are accessed through the blob storage. Given that blob storage cannot perform index probes efficiently, the primary index probes are converted into range scans followed by equality predicates on primary keys. In this option, the primary keys retrieved from the secondary index scan are sorted and converted into scan sets which are then given as input to the primary index scan. The primary keys are converted to predicates which are applied to the rows retrieved from the primary index scan. This approach is best illustrated via an example.

Figure 12:
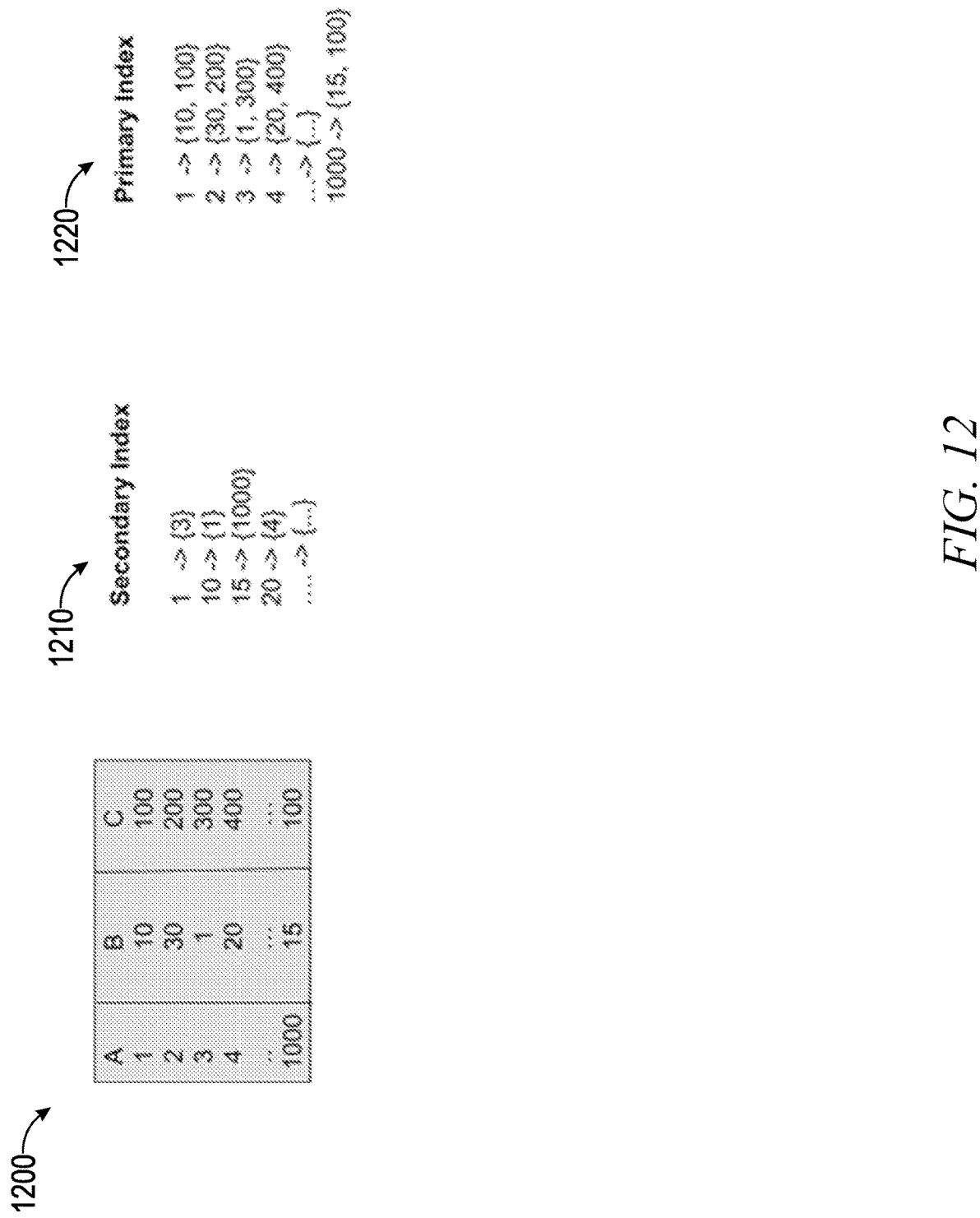
FIG. 12 illustrates accessing a secondary index and primary index in an example query on a table, in accordance with an embodiment of the subject technology.

FIG. 12 illustrates accessing a secondary index 1210 and primary index 1220 in an example query on table 1200, in accordance with an embodiment of the subject technology.

The following query that is executed on the following table is now discussed:

SELECT C FROM FOO WHERE B BETWEEN 5 and 16;

The execution of the above query would first scan the secondary index scan on the range specified by the predicate (BETWEEN 5 and 16), thus retrieving primary keys {1, 100}; the rows corresponding to those keys will have to be retrieved in order to collect the values of column 'C' which is referenced in the query. Subsequently, the sort operator takes as input the set {1, 1000}, sorts it and generates set {1, 1000}. Next, the scanset generator takes as input the sorted keys and produces a key range {1, 1000} to be used by the primary index scan in blob storage. The generated key range includes rows that are not supposed to be in the output as they don't satisfy the BETWEEN predicate. In order to filter these rows, a set of predicates are generated from the primary key values and are applied on the rows retrieved from the primary index scan. In this example, the generated predicate would be (A=1 OR A=1000); since the predicate is on the primary key column(s), there is no concern regarding the disjunctive predicate producing duplicate rows.

Figure 13:
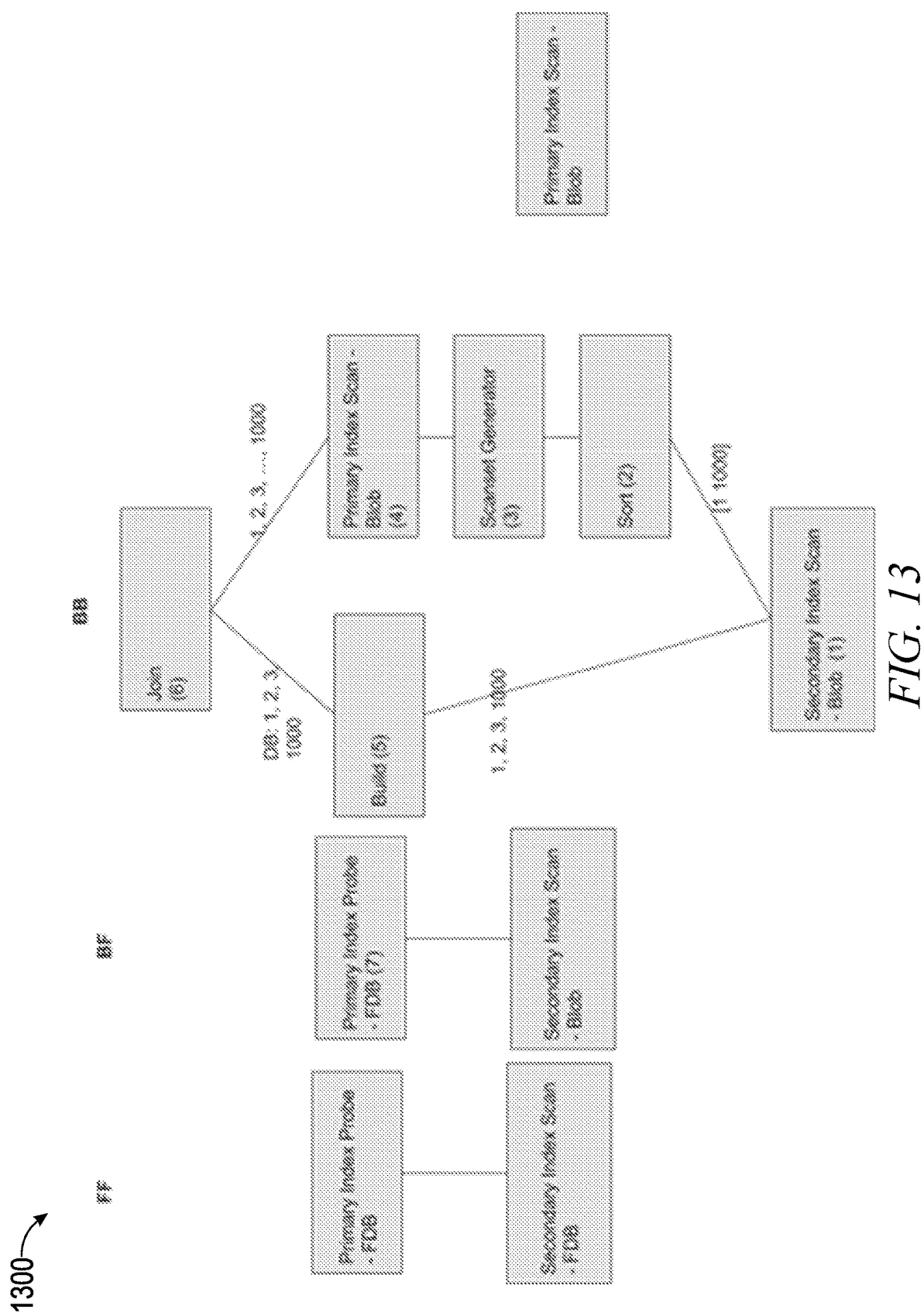
FIG. 13 illustrates execution plans of the aforementioned options available for executing an Index Range Scan using a secondary index, in accordance with an embodiment of the subject technology.

FIG. 13 illustrates execution plans 1300 of the aforementioned options available for executing an Index Range Scan using a secondary index, in accordance with an embodiment of the subject technology.

The job of the planner (e.g., compute service manager 108 or component thereof) is to identify the most efficient option and hence the cost of each of these options. In order to do so, it uses the EP information on primary and secondary indexes. For the case of secondary and unique indexes, it is assumed that computed EPs contain: a) information about ranges, i.e. range boundaries, b) basic statistics like total number of rows and NDVs, c) min/max values for primary key columns.

In terms of cost function, the wall-clock time of executing each of these options can be estimated using the following cost formulas.

For the case of FF, the cost C(FF) is:

$$C(FF)=C(FDBScan)*\#rows\_scanned+C(FDBProbe)*\#rows\_scanned,$$

where C(FDB Scan) is a constant associated with the throughput (rows2/sec) of doing a key-range scan in FDB and C(FDBProbe) is the cost associated with an index (key) probe in FDB. #rows_scanned is the cardinality of the secondary index scan and can be estimated from the EPs on the secondary index.

For the case of BF, the cost C(BF) is:

$$C(BF)=C(BlobScan)*\#rows\_scanned+C(FDBProbe)*\#rows\_scanned,$$

where C(BlobScan) is a constant associated with the throughput (rows/sec) of doing a range-scan in blob storage.

For the case of BB, the cost C(BB) is:

$$C(BB)=C(BlobScan)*\#rows\_scanned+C(sort)*\#rows\_scanned+C(ScansetGenerator)*\#rows\_scanned+C(BlobScan)*\#rows\_scanned\_on\_pkey,$$

where C(sort) is the constant associated with the throughput of the sort operator, C(ScansetGenerator) a constant associated with the throughput of the scanset generation algorithm. #rows_scanned_on_key is the number of rows to be scanned from the primary index.

It is noted here that this is not the cardinality of the logical table scan but the actual number of rows to be fetched from the primary index scan. The generated predicates on the primary key columns will prune rows that do not qualify.

As mentioned above, estimating #rows_scanned is trivial using the EPs on the secondary index. However, estimating #rows_scanned_on_pkey is more complicated and requires combining EP information from both the secondary and the primary index.

Estimating #rows_scanned_on_pkey

For every scanned range of the secondary index, the min and max values of the associated primary key columns are determined from the relevant EPs. By combining the min and max of every secondary index scanned range, the global min and max primary key values can be obtained to scan from the primary index; note that this is not exact. Combining the global min and max primary keys with the EPs from the primary index enables estimating the number of rows to scan from the primary index (#rows_scanned_on_pkey).

Figure 14:
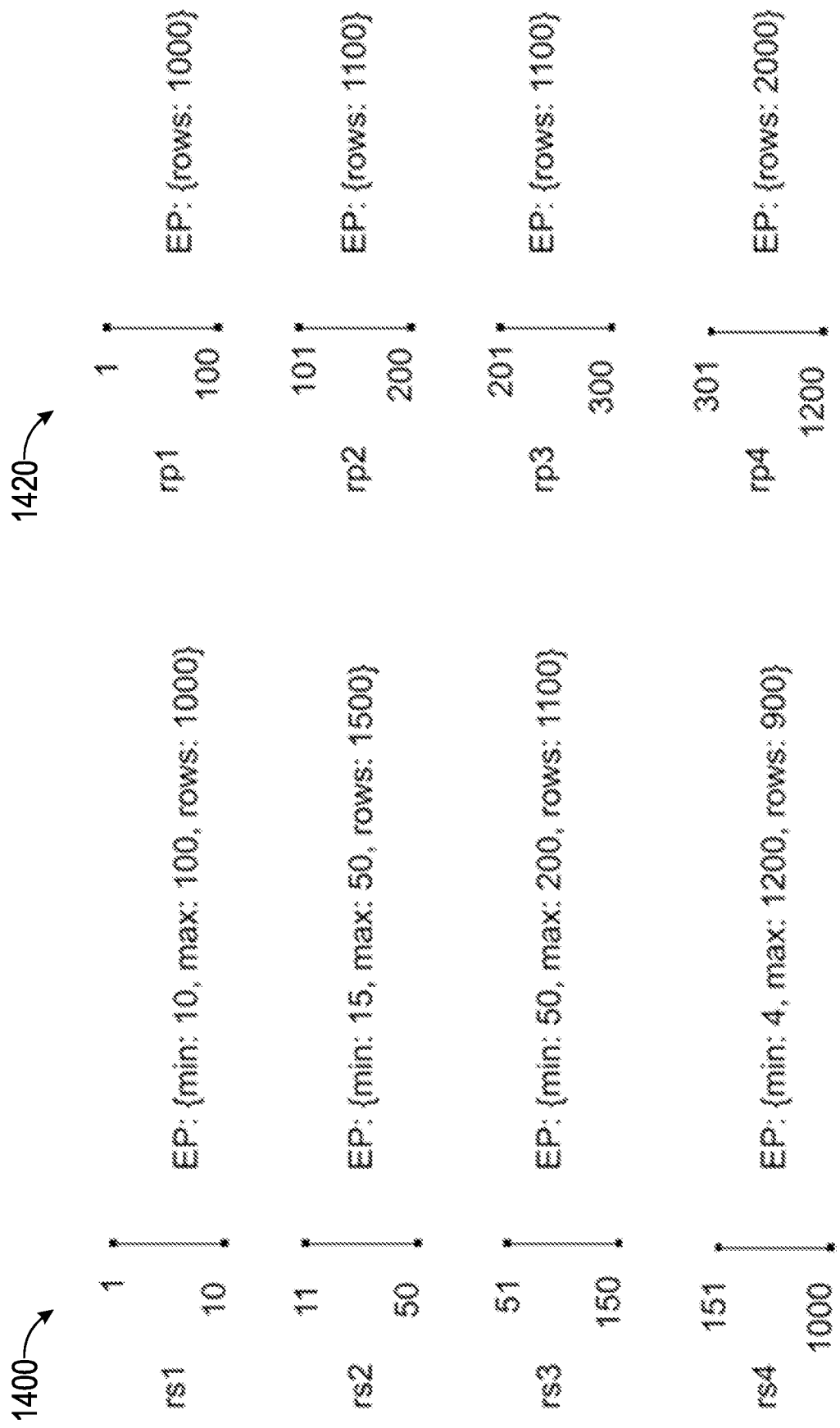
FIG. 14 illustrates example expression properties (EPs) that are utilized for planning a scan of a given table, in accordance with an embodiment of the subject technology.

FIG. 14 illustrates example expression properties (EPs) that are utilized for planning a scan of a given table, in accordance with an embodiment of the subject technology.

In the example of FIG. 14, the following query is considered:

SELECT * FROM FOO WHERE SECONDARY_KEY_COL BETWEEN 20 AND 100;

As shown, a set of EPs 1400 is provided for a secondary index. For this above query, it is necessary to scan parts of ranges rs2 and rs3 and there is an assumption that the total scanned rows will be 1500+1100=26003. Based on the EPs of these two ranges, a global min and max of the primary key columns can be obtained where min(15, 50)=15 and max(50, 200)=200. Hence, it is known that it is necessary to scan primary keys in that range (15, 200).

As further shown, a set of EP information 1420 for a primary index is provided.

Using the set of EP information 1420, it can be estimated that for a range scan on (15, 200), it is necessary to scan rp1 and rp2 from the primary index which results in 1000+1100=2100 rows being scanned from the primary index. That information can also be used to adjust the statement DOP (degree of parallelism).

The planner can use the cost functions and the EP information in order to choose the most efficient option. One thing to note here is that it is possible that the BB option (e.g., Secondary Index Scan on Blob-Primary Index Probe on Blob) ends up being more expensive than a full primary index scan on blob storage. The reason is that the number of rows scanned by the primary index (#rows_scanned_on_pkey) can be in the worst case equal to the number of rows in the table. Consequently, the planner (e.g., compute service manager 108 or component thereof) should consider the cost of a full table scan in blob storage using the primary index and compare that to the cost of the other options. More details on the access path selection logic in the planner can be found below.

Figure 15:
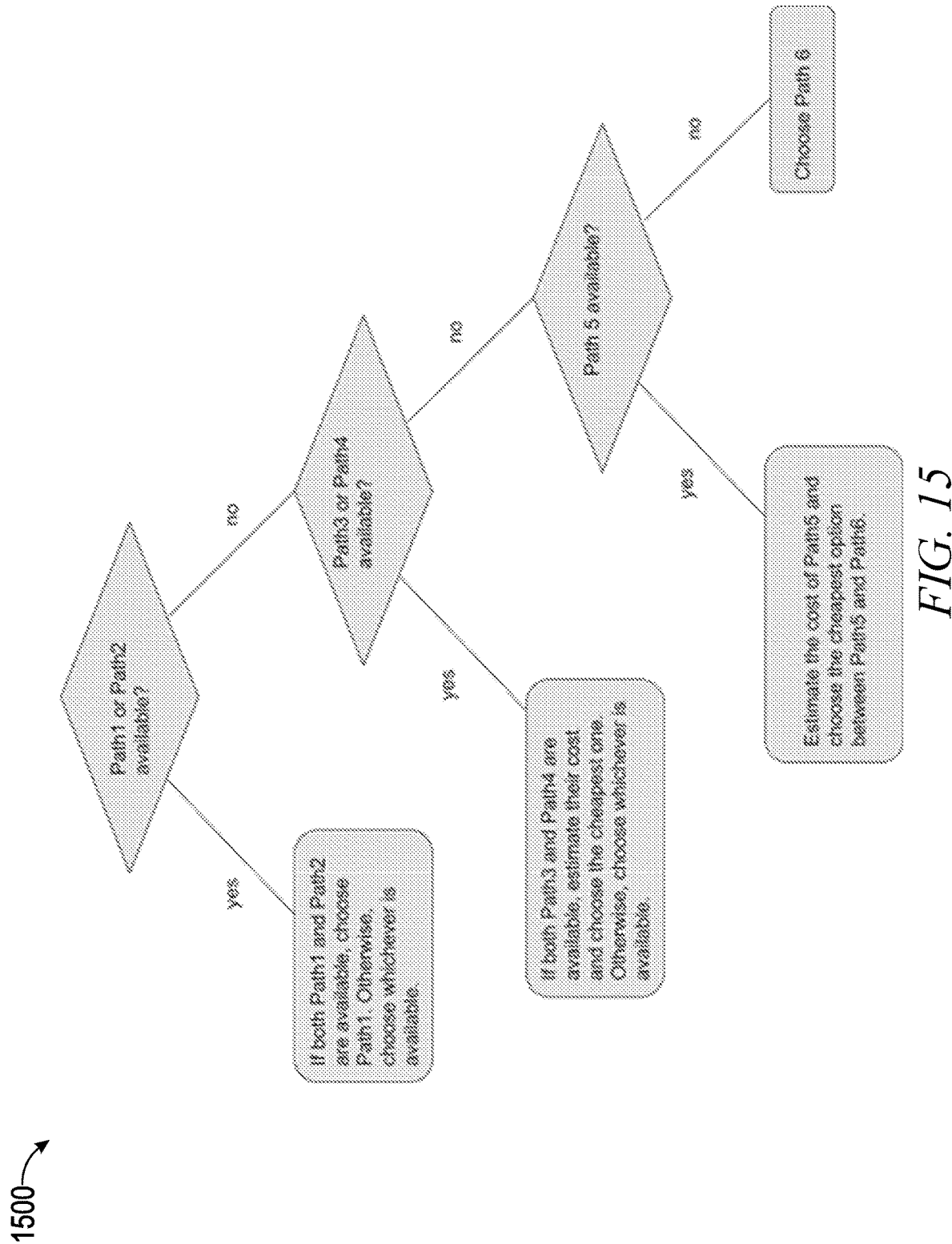
FIG. 15 illustrates an example of logic for performing an access path selection, in accordance with an embodiment of the subject technology.

FIG. 15 illustrates an example of logic for performing an access path selection, in accordance with an embodiment of the subject technology.

Next, there is a discussion of how the planner (e.g., compute service manager 108 or component thereof) chooses the access path for scanning a key-value table. In the first version, the access path selection for key-value tables will be performed via a rule-based approach with some cost-based elements.

One important consideration when executing a statement on key-value tables is minimizing compilation latency. To that end, it is important to avoid performing unnecessary work during planning such as scanset generation and range pruning when it is clear that it is not needed. For example, when there is an equality predicate on a primary or unique column, then Index Unique Probe should be used by default. By considering the different access methods that were described earlier and the types of indexes that are supported on key-value tables, a number of options in terms of access paths are provided and are listed below.

Path 1: Single Row by Unique or Primary Key

This is the case where there are an equality predicate on a primary or unique key.

Path 2: Range Scan on Primary Key

This is the case where there are predicates on primary keys that can be used to prune ranges from the primary index.

Path 3: Range Index-Only Scan on Secondary Key

This is the case where there are predicates on secondary keys that can be used to prune ranges of the secondary index and all the referenced columns of a table in a statement can be extracted from the secondary index.

Path 4: Range Scan on Unique Key

This is the case where there are predicates on unique columns that can be used to prune ranges of the associated unique index.

Path 5: Range Scan on Secondary Key

This is the case where there are predicates on secondary key columns that can be used to prune ranges of the secondary index.

Path 6: Full Table Scan
This is the default access path in case none of the above paths exist for scanning a key-value table.

As shown in FIG. 15, The access path selection logic is summarized in decision diagram 1500. The underlying assumptions are that Path1 and Path2 should be ranked higher than any other path. If none of these two is available, Path3 and Path4 is the second highest ranking group and they should be preferred over Path5 and Path6. Cost estimation is used to arbiter between Path3 and Path4. If none of these paths are available, then the last ranking group is Path5 and Path6 and the decision should be based on their relative costs; Path6 is always available as it is the full table scan.

Compaction for Hybrid Indexes

The compaction process appears in two forms: dedicated and online. Dedicated compaction takes place when the compaction DDL is submitted by the KV BG tasks (i.e., ALTER TABLE: table COMPACT HYBRID TABLE); Online compaction takes place when records are scanned during query execution, and it is an internal process of the transaction manager 440. Both forms are best-effort. In an implementation, the dedicated compactor process is extended, as online compaction occurs automatically.

Compaction Algorithm:

The dedicated compaction algorithm for indexes takes place when dedicated table compaction is submitted. After the base table is compacted, its indexes will be compacted serially.

Compaction Failure Resiliency

Dedicated compaction will not roll-back any work done if at any point during the compaction process an error occurs. For example, if there is a table FOO with 3 indexes: IDX1, IDX2, and IDX3. The steps in the dedicated compaction process will be the following: (1.) Compact table FOO. (2.) Compact index IDX1. (3.) Compact index IDX2. (4.) Compact index IDX3. In some example embodiments, if an error occurs at step 3 (IDX2 compaction), the compaction work completed in steps 1 and 2 will not be rolled back. A benefit of this failure model is that completed work is not undone. However, it might lead to some indexes not being compacted. The latter can be mitigated by the online compaction.

Figure 16:
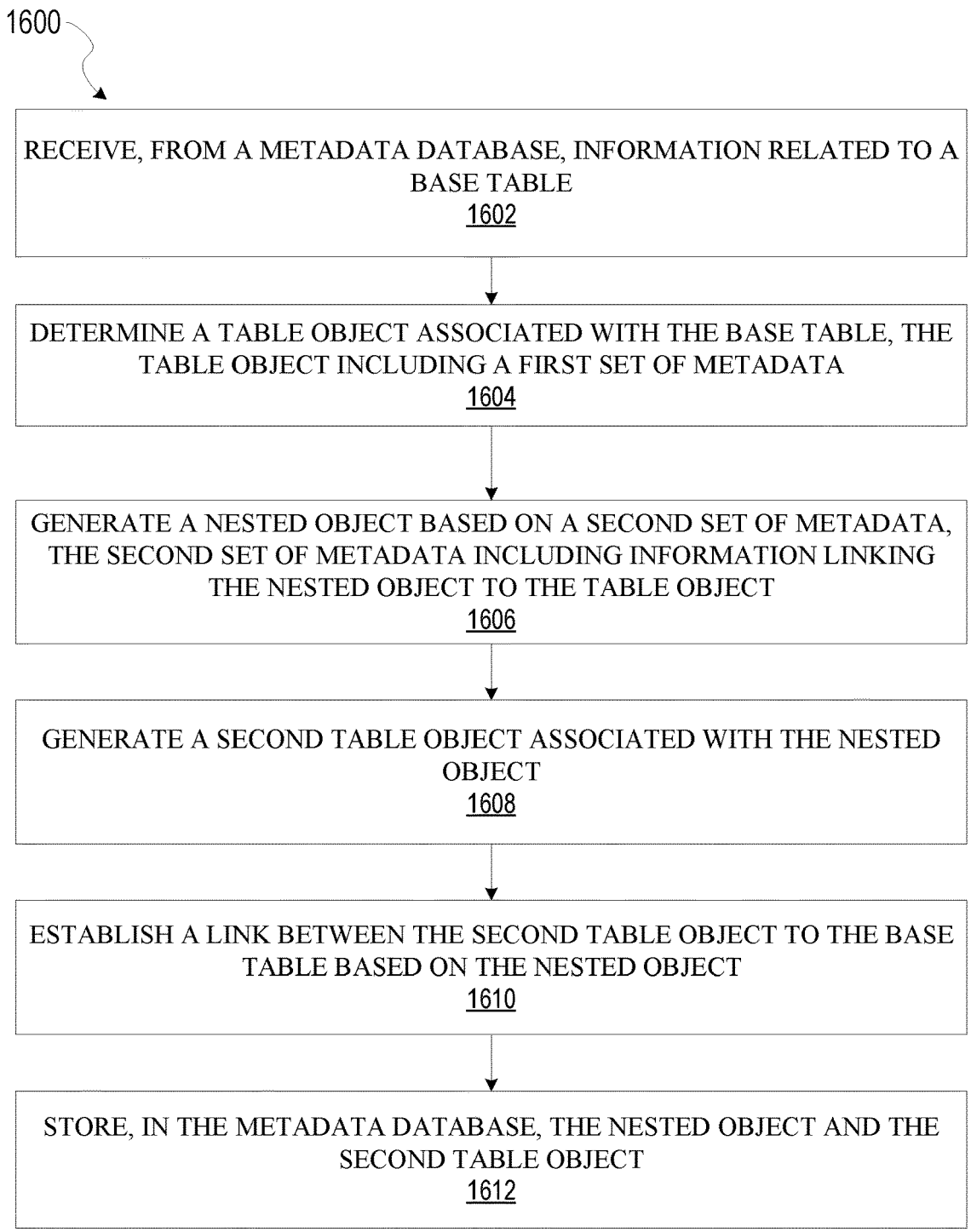
FIG. 16 is a flow diagram illustrating operations of a database system in performing a method, in accordance with some embodiments of the present disclosure.

FIG. 16 is a flow diagram illustrating operations of a database system in performing a method, in accordance with some embodiments of the present disclosure. The method 1600 may be embodied in computer-readable instructions for execution by one or more hardware components (e.g., one or more processors) such that the operations of the method 1600 may be performed by components of network-based database system 102, such as components of the compute service manager 108 or a node in the execution platform 110. Accordingly, the method 1600 is described below, by way of example with reference thereto. However, it shall be appreciated that the method 1600 may be deployed on various other hardware configurations and is not intended to be limited to deployment within the network-based database system 102.

At operation 1602, compute service manager 108 receives, from a metadata database, information related to a base table.

At operation 1604, compute service manager 108 determines a table object associated with the base table, the table object including a first set of metadata.

At operation 1606, compute service manager 108 generates a nested object based on a second set of metadata, the second set of metadata including information linking the nested object to the table object.

At operation 1608, compute service manager 108 generates a second table object associated with the nested object, the second table object representing a secondary index of the base table, the second table object including information linking the second table object to the nested object.

At operation 1610, compute service manager 108 establishes a link between the second table object to the base table based on the nested object.

At operation 1612, compute service manager 108 stores, in the metadata database, the nested object and the second table object.

In an embodiment, the second table object includes a third set of metadata, the third set of metadata including different metadata from the second set of metadata.

In an embodiment, the third set of metadata comprises a nested object identifier corresponding to the nested object, a key value counter, a set of column identifiers, a particular identifier associated with the base table, an index type.

In an embodiment, the second set of metadata comprises a nested object identifier, a nested object domain identifier, a particular identifier corresponding to the table object, and nested relationship type identifier.

In an embodiment, the first set of metadata comprises an account identifier, a first unique identifier for the base table, a second unique identifier for a particular schema of the base table, and a name of the base table.

In an embodiment, the base table is a parent table of a second table associated with the second table object.

In an embodiment, further operations include: generating a constraint object associated with the second table object, the constraint object including a particular set of metadata.

In an embodiment, the particular set of metadata comprises information indicating a deferability of a constraint, a definition of the constraint, an identifier of the constraint, and information indicating a kind of the constraint.

In an embodiment, further operations include: generating a second nested object based on a particular set of metadata, the particular set of metadata including information linking the second nested object to the table object; generating a third table object associated with the second nested object, the third table object representing a particular secondary index of the base table, the third table object including information linking the third table object to the second nested object; establishing a link between the third table object to the base table based on the second nested object; and storing, in the metadata database, the second nested object and the third table object.

In an embodiment, secondary index and the particular secondary index are associated with different prefixes and different columns of the base table.

Figure 17:
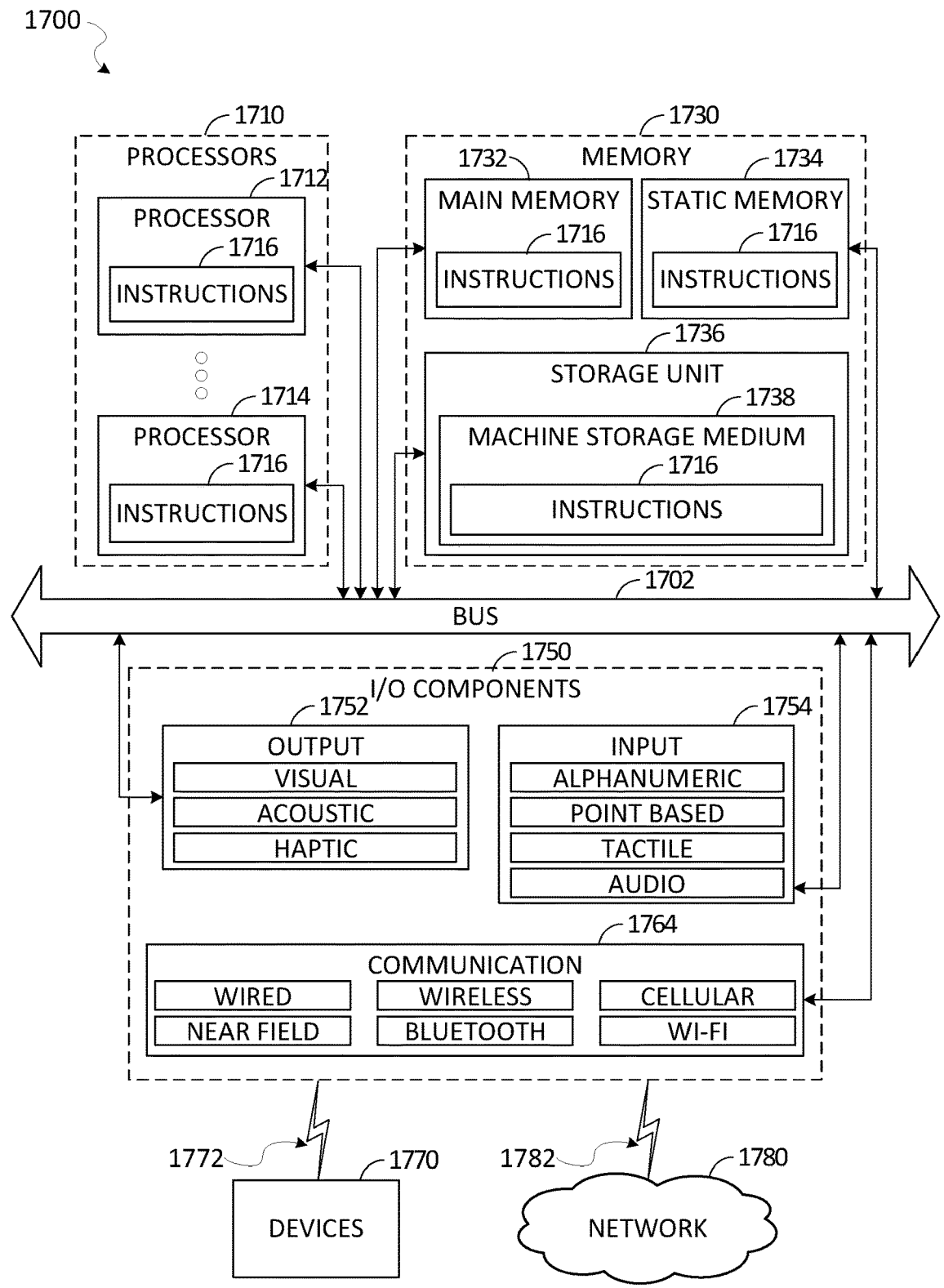
FIG. 17 illustrates a diagrammatic representation of a machine in the form of a computer system within which a set of instructions may be executed for causing the machine to perform any one or more of the methodologies discussed herein, in accordance with some embodiments of the present disclosure.

FIG. 17 illustrates a diagrammatic representation of a machine 1700 in the form of a computer system within which a set of instructions may be executed for causing the machine 1700 to perform any one or more of the methodologies discussed herein, according to an example embodiment. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. For example, the instructions 1716 may cause the machine 1700 to execute any one or more operations of method 800. As another example, the instructions 1716 may cause the machine 1700 to implement portions of the data flows discussed before. In this way, the instructions 1716 transform a general, non-programmed machine into a particular machine 1700 (e.g., the compute service manager 108 or a node in the execution platform) that is specially configured to carry out any one of the described and illustrated functions in the manner described herein.

In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein.

The machine 1700 includes processors 1710, memory 1730, and input/output (I/O) components 1750 configured to communicate with each other such as via a bus 1702. In an example embodiment, the processors 1710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1712 and a processor 1714 that may execute the instructions 1716. The term "processor" is intended to include multi-core processors 1710 that may comprise two or more independent processors (sometimes referred to as "cores") that may execute instructions 1716 contemporaneously. Although FIG. 17 shows multiple processors 1710, the machine 1700 may include a single processor with a single core, a single processor with multiple cores (e.g., a multi-core processor), multiple processors with a single core, multiple processors with multiple cores, or any combination thereof.

The memory 1730 may include a main memory 1732, a static memory 1734, and a storage unit 1736, all accessible to the processors 1710 such as via the bus 1702. The main memory 1732, the static memory 1734, and the storage unit 1736 store the instructions 1716 embodying any one or more of the methodologies or functions described herein. The instructions 1716 may also reside, completely or partially, within the main memory 1732, within the static memory 1734, within machine storage medium 1738 of the storage unit 1736, within at least one of the processors 1710 (e.g., within the processor's cache memory), or any suitable combination thereof, during execution thereof by the machine 1700.

The I/O components 1750 include components to receive input, provide output, produce output, transmit information, exchange information, capture measurements, and so on. The specific I/O components 1750 that are included in a particular machine 1700 will depend on the type of machine. For example, portable machines such as mobile phones will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion and the grouping is in no way limiting. In various example embodiments, the I/O components 1750 may include output components 1752 and input components 1754. The output components 1752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 may include a network interface component or another suitable device to interface with the network 1780. In further examples, the communication components 1764 may include wired communication components, wireless communication components, cellular communication components, and other communication components to provide communication via other modalities. The devices 1770 may be another machine or any of a wide variety of peripheral devices (e.g., a peripheral device coupled via a universal serial bus (USB)). For example, as noted above, the machine 1700 may correspond to any one of the compute service manager 108 or the execution platform, and the devices 1770 may include the client device 114 or any other computing device described herein as being in communication with the network-based database system 102 or the cloud storage platform 104.

The various memories (e.g., 1730, 1732, 1734, and/or memory of the processor(s) 1710 and/or the storage unit 1736) may store one or more sets of instructions 1716 and data structures (e.g., software) embodying or utilized by any one or more of the methodologies or functions described herein. These instructions 1716, when executed by the processor(s) 1710, cause various operations to implement the disclosed embodiment Described implementations of the subject matter can include one or more features, alone or in combination as illustrated below by way of example.

Example 1. A method for processing data on a hybrid database: receiving a query on a hybrid database comprising transactional database data and aggregated database data; determining that the query is a transactional query to be applied to update the transactional database data; and executing the query on the transactional query on the transactional database data using indices in the transactional database data and uniqueness constraints on the query.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1716 may be transmitted or received over the network 1780 using a transmission medium via a network interface device (e.g., a network interface component included in the communication components 1764) and utilizing any one of a number of well-known transfer protocols (e.g., hypertext transfer protocol (HTTP)). Similarly, the instructions 1716 may be transmitted or received using a transmission medium via the coupling 1772 (e.g., a peer-to-peer coupling) to the devices 1770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1716 for execution by the machine 1700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
a memory storing instructions that cause the at least one hardware processor to perform operations comprising:
obtaining a read timestamp of a first transaction;
performing a first read operation on a parent table associated with the first transaction to determine a set of committed versions of the parent table;
determining whether a key exists in the parent table based on the first transaction;
in response to the key existing in the parent table, performing a first write operation on a child table;
determining whether a duplicate key exists in the child table based on the key of the first write operation;
in response to determining that there is no duplicate key in the child table, determining whether there is a conflict with the key;
in response to determining that there is no conflict with the key, performing a second write operation on a secondary index table of the child table;
determining whether a particular duplicate key exists in the secondary index table based a particular key from the second write operation;
in response to determining that there is no duplicate key in the secondary index table, determining whether there is a conflict with the particular key; and
in response to determining that there is no conflict with the particular key, performing a second read operation on the parent table of the child table to determine whether this is a set of live in-flight write operations and a set of write operations committed after the read timestamp and before a write timestamp.

2. The system of claim 1, wherein the operations further comprise:
in response to determining that there is not the set of live in-flight write operations nor the set of write operations committed after the read timestamp and before the write timestamp, determining whether there is a recent committed or in-flight delete operation of the parent table;
in response to determining that there is not the recent committed or in-flight delete operation of the parent table, performing a finalize operation of a particular statement associated with the first write operation on the child table; and
performing a commit operation of the first transaction.

3. The system of claim 1, wherein the first transaction includes a first statement to perform a particular write operation on the parent table, and a second statement to perform the first write operation on the child table.

4. The system of claim 1, wherein the operations further comprise:
in response to the key not existing in the parent table, throwing a foreign key constraint exception.

5. The system of claim 1, wherein the operations further comprise:
in response to determining that there is the duplicate key in the child table, throwing a uniqueness exception.

6. The system of claim 1, wherein the operations further comprise:
in response to determining that there is the conflict with the key, restarting a particular statement associated with the first write operation on the child table.

7. The system of claim 1, wherein the operations further comprise:
in response to determining that there is the duplicate key in the secondary index table, throwing a uniqueness exception.

8. The system of claim 1, wherein the operations further comprise:
in response to determining that there is the conflict with the particular key, restarting a particular statement associated with the second write operation on the secondary index table of the child table.

9. The system of claim 2, wherein the operations further comprise:
in response to determining that there is the set of live in-flight write operations and the set of write operations committed after the read timestamp and before the write timestamp, restarting a particular statement associated with the second write operation on the secondary index table of the child table.

10. A method comprising:
obtaining a read timestamp of a first transaction;
performing a first read operation on a parent table associated with the first transaction to determine a set of committed versions of the parent table;
determining whether a key exists in the parent table based on the first transaction;
in response to the key existing in the parent table, performing a first write operation on a child table;
determining whether a duplicate key exists in the child table based on the key of the first write operation;
in response to determining that there is no duplicate key in the child table, determining whether there is a conflict with the key;
in response to determining that there is no conflict with the key, performing a second write operation on a secondary index table of the child table;
determining whether a particular duplicate key exists in the secondary index table based a particular key from the second write operation;
in response to determining that there is no duplicate key in the secondary index table, determining whether there is a conflict with the particular key; and
in response to determining that there is no conflict with the particular key, performing a second read operation on the parent table of the child table to determine whether this is a set of live in-flight write operations and a set of write operations committed after the read timestamp and before a write timestamp.

11. The method of claim 10, further comprising:
in response to determining that there is not the set of live in-flight write operations nor the set of write operations committed after the read timestamp and before the write timestamp, determining whether there is a recent committed or in-flight delete operation of the parent table;
in response to determining that there is not the recent committed or in-flight delete operation of the parent table, performing a finalize operation of a particular statement associated with the first write operation on the child table; and
performing a commit operation of the first transaction.

12. The method of claim 10, wherein the first transaction includes a first statement to perform a particular write operation on the parent table, and a second statement to perform the first write operation on the child table.

13. The method of claim 10, further comprising:
in response to the key not existing in the parent table, throwing a foreign key constraint exception.

14. The method of claim 10, further comprising:
in response to determining that there is the duplicate key in the child table, throwing a uniqueness exception.

15. The method of claim 10, further comprising:
in response to determining that there is the conflict with the key, restarting a particular statement associated with the first write operation on the child table.

16. The method of claim 10, further comprising:
in response to determining that there is the duplicate key in the secondary index table, throwing a uniqueness exception.

17. The method of claim 10, further comprising:
in response to determining that there is the conflict with the particular key, restarting a particular statement associated with the second write operation on the secondary index table of the child table.

18. The method of claim 11, further comprising:
in response to determining that there is the set of live in-flight write operations and the set of write operations committed after the read timestamp and before the write timestamp, restarting a particular statement associated with the second write operation on the secondary index table of the child table.

19. A non-transitory computer-storage medium comprising instructions that, when executed by one or more processors of a machine, configure the machine to perform operations comprising:
obtaining a read timestamp of a first transaction;
performing a first read operation on a parent table associated with the first transaction to determine a set of committed versions of the parent table;
determining whether a key exists in the parent table based on the first transaction;
in response to the key existing in the parent table, performing a first write operation on a child table;
determining whether a duplicate key exists in the child table based on the key of the first write operation;
in response to determining that there is no duplicate key in the child table, determining whether there is a conflict with the key;
in response to determining that there is no conflict with the key, performing a second write operation on a secondary index table of the child table;
determining whether a particular duplicate key exists in the secondary index table based a particular key from the second write operation;
in response to determining that there is no duplicate key in the secondary index table, determining whether there is a conflict with the particular key; and
in response to determining that there is no conflict with the particular key, performing a second read operation on the parent table of the child table to determine whether this is a set of live in-flight write operations and a set of write operations committed after the read timestamp and before a write timestamp.

20. The non-transitory computer-storage medium of claim 19, wherein the operations further comprise:
in response to determining that there is not the set of live in-flight write operations nor the set of write operations committed after the read timestamp and before the write timestamp, determining whether there is a recent committed or in-flight delete operation of the parent table;
in response to determining that there is not the recent committed or in-flight delete operation of the parent table, performing a finalize operation of a particular statement associated with the first write operation on the child table; and
performing a commit operation of the first transaction.

21. The non-transitory computer-storage medium of claim 19, wherein the first transaction includes a first statement to perform a particular write operation on the parent table, and a second statement to perform the first write operation on the child table.

22. The non-transitory computer-storage medium of claim 19, wherein the operations further comprise:
in response to the key not existing in the parent table, throwing a foreign key constraint exception.

23. The non-transitory computer-storage medium of claim 19, wherein the operations further comprise:
in response to determining that there is the duplicate key in the child table, throwing a uniqueness exception.

24. The non-transitory computer-storage medium of claim 19, wherein the operations further comprise:
in response to determining that there is the conflict with the key, restarting a particular statement associated with the first write operation on the child table.

25. The non-transitory computer-storage medium of claim 19, wherein the operations further comprise:
in response to determining that there is the duplicate key in the secondary index table, throwing a uniqueness exception.

26. The non-transitory computer-storage medium of claim 19, wherein the operations further comprise:
in response to determining that there is the conflict with the particular key, restarting a particular statement associated with the second write operation on the secondary index table of the child table.

27. The non-transitory computer-storage medium of claim 20, wherein the operations further comprise:
in response to determining that there is the set of live in-flight write operations and the set of write operations committed after the read timestamp and before the write timestamp, restarting a particular statement associated with the second write operation on the secondary index table of the child table.

* * * * *